(12) United States Patent
Jung et al.

(10) Patent No.: US 11,899,860 B2
(45) Date of Patent: Feb. 13, 2024

(54) REMOTE INTERACTION CONTROL METHOD AND ELECTRONIC DEVICE OF A REMOTE INPUT DEVICE DETACHED FROM AN ELECTRONIC DEVICE

(71) Applicant: SAMSUNG ELECTRONICS CO., LTD., Suwon-si (KR)

(72) Inventors: Inhyung Jung, Suwon-si (KR); Banghyun Kwon, Suwon-si (KR); Sangheon Kim, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/944,740

(22) Filed: Sep. 14, 2022

(65) Prior Publication Data
US 2023/0004234 A1    Jan. 5, 2023

Related U.S. Application Data

(63) Continuation of application No. PCT/KR2021/003173, filed on Mar. 15, 2021.

(30) Foreign Application Priority Data

Mar. 16, 2020 (KR) .................. 10-2020-0032103

(51) Int. Cl.
*G06F 3/038* (2013.01)
*H02J 50/12* (2016.01)
*G06F 3/0354* (2013.01)

(52) U.S. Cl.
CPC .......... *G06F 3/038* (2013.01); *G06F 3/03545* (2013.01); *H02J 50/12* (2016.02)

(58) Field of Classification Search
CPC .............. G06F 3/038; G06F 3/03545; G06F 2203/0384; G06F 3/017; G06F 3/0346;
(Continued)

(56) References Cited

U.S. PATENT DOCUMENTS 8,558,790 B2    10/2013    Kim
2011/0304544 A1    12/2011    Chuang et al.
(Continued)

FOREIGN PATENT DOCUMENTS

KR    10-2013-0142824    12/2013
KR    10-2014-0056959    5/2014
(Continued)

OTHER PUBLICATIONS

International Search Report dated Jun. 16, 2021, for PCT/KR2021/003173, 5 pp., including English translation.
(Continued)

*Primary Examiner* — David D Davis
(74) *Attorney, Agent, or Firm* — Nixon & Vanderhye P.C.

(57) ABSTRACT

An electronic device may include: a first communication circuit for connecting first communication with a remote input device positioned in the electronic device; a second communication circuit for connecting second communication with an external display device; a wireless charging coil for sensing a change in a magnetic field signal of a remote input device, and outputting an electrical signal according to the change in a magnetic field signal; and a processor electrically connected to the first communication circuit, the second communication circuit, and the wireless charging coil, wherein the processor determines detachment of the electronic device of a remote input device, receives, through wireless communication, a button input signal of the remote input device and sensor data of the remote input device, and
(Continued)

can activate one from among a plurality of interactions on the basis of the button input signal and/or the sensor data.

15 Claims, 19 Drawing Sheets

(58) Field of Classification Search
CPC ........ G06F 3/0383; G06F 3/041; G06F 3/046;
G06F 3/0488; G06F 3/14; G06F 3/04162;
G06F 3/1431; H02J 50/12
See application file for complete search history.

(56) References Cited

U.S. PATENT DOCUMENTS

| | | |
|---|---|---|
| 2013/0342456 A1 | 12/2013 | Choi et al. |
| 2014/0125606 A1 | 5/2014 | Namkung |
| 2015/0253982 A1 | 9/2015 | Sliger |
| 2016/0054821 A1* | 2/2016 | Kim ................... G06F 3/0442 345/179 |
| 2020/0034099 A1* | 1/2020 | Jung ........................ G09G 5/14 |
| 2020/0036217 A1* | 1/2020 | Park ........................ H02J 50/80 |
| 2020/0050338 A1* | 2/2020 | Choi ........................ H02J 50/90 |

FOREIGN PATENT DOCUMENTS

| | | |
|---|---|---|
| KR | 10-2015-0014323 | 2/2015 |
| KR | 10-2016-0023163 | 3/2016 |

OTHER PUBLICATIONS

Written Opinion of the ISA dated Jun. 16, 2021, for PCT/KR2021/003173, 7 pp., including English translation.

\* cited by examiner

830

| Length (1byte) | AD Type: Flags (1byte) | Flag Data (1byte) | Length (1byte) | AD Type: Manufacturer Data (1byte) | Company ID (2byte) | Version (1byte) | Service ID (1byte) | Service SpecificData (N byte) |
|---|---|---|---|---|---|---|---|---|
| 0x02 | 0x01 | 0x1A | Variable | 0xFF | 0x0075 | 0x01 | 0xaa | Variable |

FIG.9C

REMOTE INTERACTION CONTROL METHOD AND ELECTRONIC DEVICE OF A REMOTE INPUT DEVICE DETACHED FROM AN ELECTRONIC DEVICE

CROSS-REFERENCE TO RELATED APPLICATIONS

This application is a continuation of International Application No. PCT/KR2021/003173, filed Mar. 15, 2021, designating the United States, in the Korean Intellectual Property Receiving Office, and claiming priority to Korean Patent Application No. 10-2020-0032103, filed on Mar. 16, 2020, in the Korean Intellectual Property Office, the disclosures of which are all hereby incorporated by reference herein in their entireties.

FIELD

Various example embodiments may relate to a method and/or an electronic device for controlling a remote interaction (e.g., an air mouse mode and an air action mode) of a remote input device (e.g., a stylus pen) detached from the electronic device.

BACKGROUND

A remote input device (e.g., a stylus pen) wirelessly connected to an electronic device (e.g., a smart phone) can be connected to the electronic device according to a compatible short-range wireless communication standard (e.g., Bluetooth/Wi-Fi). Here, a wireless communication distance through which the electronic device and the remote input device can be connected may vary according to the short-range wireless communication standard. As an embodiment, the remote input device compatible with the Bluetooth communication standard can provide a wireless communication distance of less than 10 m. As an embodiment, the remote input device compatible with the Wi-Fi communication standard can provide a wireless communication distance of less than 100 m. Accordingly, the remote input device can determine at least one wireless communication standard from the compatible wireless communication standards according to communication performance, and be wirelessly connected to the electronic device.

The electronic device can provide a remote (e.g., an air action mode) as a default in response to a detachment state of the remote input device (e.g., the stylus pen). The electronic device can receive motion sensor data (e.g., acceleration, gyro, and geomagnetic sensor data) along with a button input from the remote input device. The electronic device can determine at least one directional motion in response to the received motion sensor data. The electronic device can provide a remote interaction capable of executing at least one application operation (e.g., volume up/down) corresponding to the determined directional motion.

SUMMARY

An electronic device cannot provide a complete remote control interface with only one remote interaction (e.g., an air action mode). The electronic device should be able to provide various remote interactions (e.g., an air mouse mode) through a remote input device, along with a remote motion instruction interaction (e.g., the air action mode), while the electronic device is in a communication connection activation state (e.g., desktop experience (DEX) mode activation) with other external electronic devices.

The device can receive a remote control input of a specific application through the remote motion instruction interaction (e.g., the air action mode). However, although an execution application conversion operation, and a separate user input operation (e.g., pen input) through the electronic device (e.g., a touch screen) such as icon selection for application execution, etc. are needed, a support for them is not being provided.

According to various example embodiments, a method of remote interaction control for a remote input device (e.g., a stylus pen) detached from an electronic device can be provided. It can determine a communication connection activation state (e.g., DEX mode activation) between the electronic device and another external display device (e.g., a monitor, a notebook, or a tablet). It can determine an attachment or detachment operation (e.g., a detached state) of the remote input device (e.g., the stylus pen) with respect to the electronic device, and provide various remote interactions to the electronic device in response to a trigger input (e.g., a button input) of the remote input device.

An electronic device of various example embodiments may include a first communication circuit, a second communication circuit, a wireless charging coil, a sensor circuit, a first interface display unit, a second interface display unit, and a processor. The first communication circuit may connect first communication with a remote input device positioned in the electronic device. The second communication circuit may connect second communication with an external display device. The wireless charging coil may sense a change of a magnetic field signal of the remote input device, and output an electrical signal dependent on the change of the magnetic field signal. The sensor circuit may sense the movement of the remote input device. The first interface display unit may display a first user interface on an internal display of the electronic device. The second interface display unit may display a second user interface on the external display device. The processor may determine the attachment and detachment of the remote input device, and recognize a button input signal of the remote input device and sensor data of the remote input device, through wireless communication. The processor may activate one of a plurality of interactions, based on the button input signal or the sensor data.

A remote interaction control method of an electronic device of various example embodiments may include connecting first communication with a remote input device positioned in the electronic device, connecting second communication with an external display device, outputting an electrical signal dependent on the attachment and detachment of the remote input device, determining the detachment of the remote input device with respect to the electronic device, receiving, through wireless communication, a button input signal of the remote input device and sensor data of the remote input device, and activating one of a plurality of interactions, based on at least one of the button input signal and the sensor data of the remote input device.

According to various example embodiments, an electronic device may determine at least one compatible wireless communication standard in response to an attachment/detachment state of a remote input device, and convert into a wireless connection state with the remote input device. The electronic device may present a first interface (e.g., a first user interface screen) for the wirelessly connected remote input device (e.g., a stylus pen) through a built-in display.

The electronic device may output a signal (e.g., a graphic buffer signal) for presenting a user interface through a peripheral external display device and a wired/wireless communication standard (e.g., a high-definition multimedia interface (HDMI), wireless fidelity (Wi-Fi), etc.). The electronic device may present a second interface (e.g., a second user interface screen) through the external display device that is wired/wireless communication connected. It may control at least one graphic object (e.g., an app icon) from the second interface in response to a touch control input of the electronic device. In this case, the electronic device may optimize information of the wired/wireless connected external display device and present the second interface (e.g., a DEX screen) different from the first interface.

In addition, various effects directly or indirectly identified through the present document may be presented.

BRIEF DESCRIPTION OF DRAWINGS

The above and other aspects, features, and advantages of certain embodiments will be more apparent from the following detailed description, taken in conjunction with the accompanying drawings, in which:

FIG. 9C is a diagram illustrating an advertisement packet according to various example embodiments.

In connection with a description of the drawings, the same or similar reference numerals may be used for the same or similar components.

DETAILED DESCRIPTION

Figure 1:
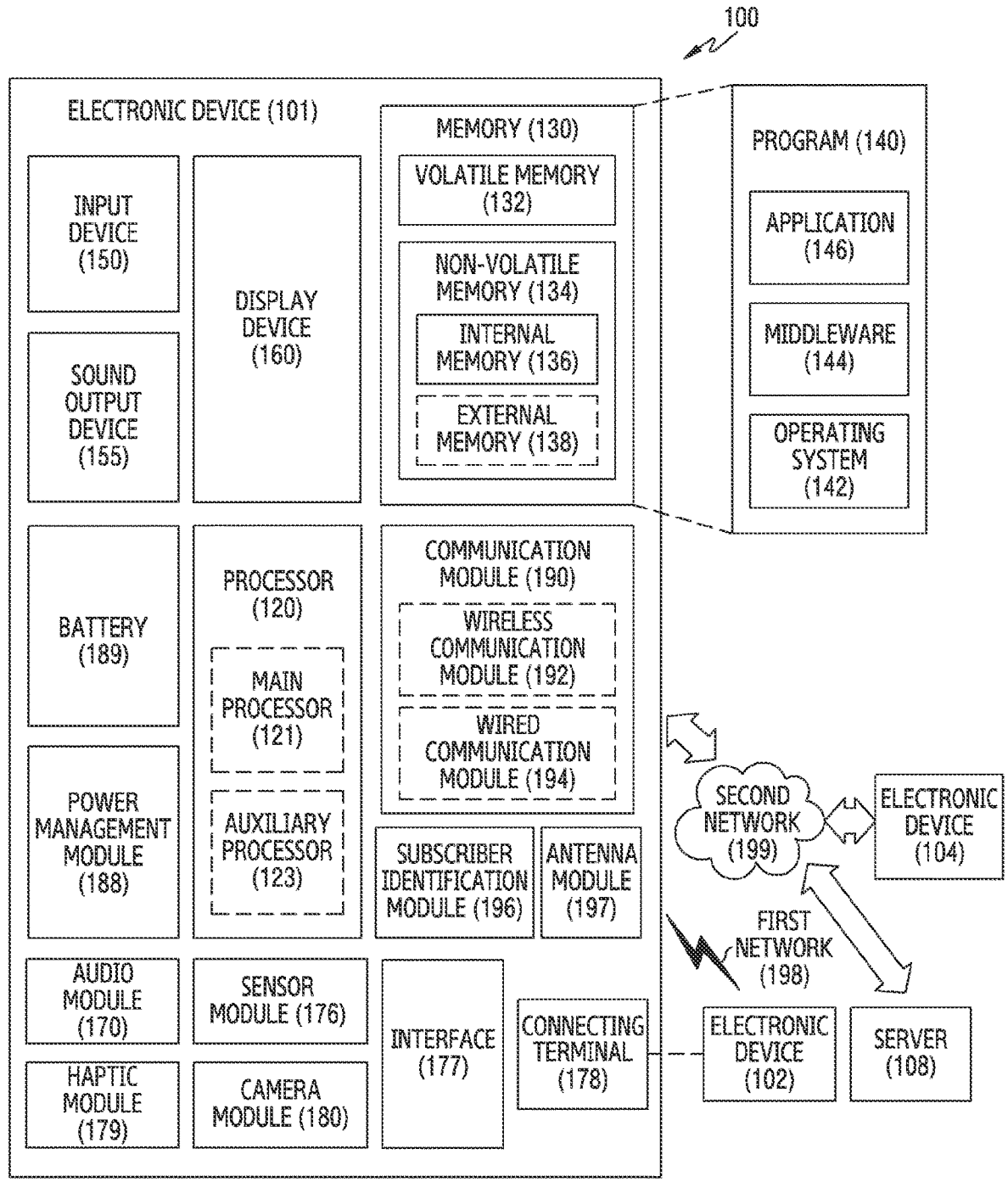
FIG. 1 is a block diagram of an electronic device in a network environment according to various example embodiments.

Hereinafter, various example embodiments will be described with reference to the accompanying drawings. For description's convenience sake, the sizes of the components shown in the drawings may be exaggerated or reduced, and the present disclosure is not necessarily limited to the illustrated.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101. The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
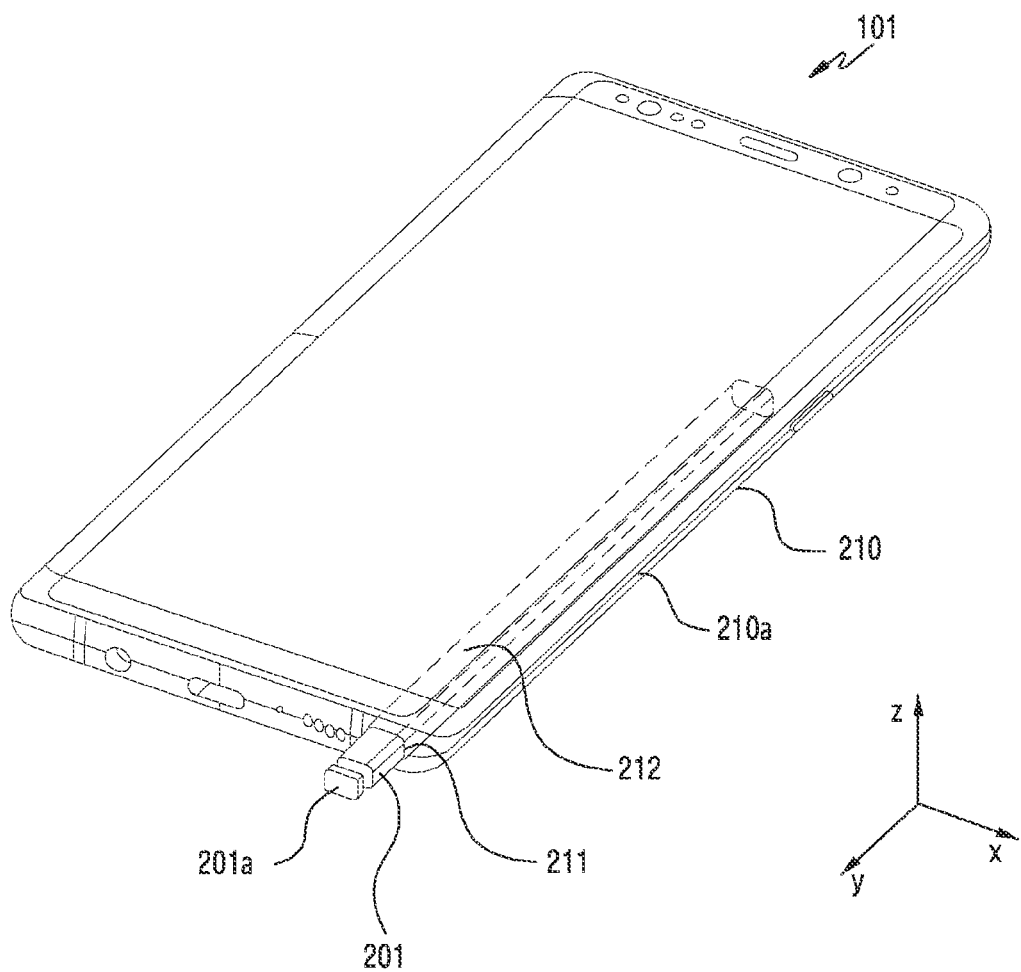
FIG. 2 is a perspective view of an electronic device including a stylus pen according to an example embodiment.

FIG. 2 is a perspective view of an electronic device 101 including a stylus pen 201 according to an embodiment. According to an embodiment, the stylus pen 201 in the present document may correspond to not the electronic device 101 of FIG. 1 but the input device 150 of FIG. 1 as well.

Referring to FIG. 2, the electronic device 101 of an embodiment may correspond to the electronic device 101 illustrated in FIG. 1. The electronic device 101 may include a structure into which the stylus pen 201 may be inserted. The stylus pen 201 may correspond to the input device 150 of FIG. 1 or may correspond to the electronic device 102. The electronic device 101 may include a housing 210, and may include a hole 211 in a portion of the housing 210, for example, a portion of a side surface 210*a*. The electronic device 101 may include a first internal space 212 that is an accommodation space connected to the hole 211, and the stylus pen 201 may be inserted into the first internal space 212. According to the illustrated embodiment, the stylus pen 201 may include a first button 201*a* that may be pressed at one end, wherein the stylus pen 201 is easily taken out from the first internal space 212 of the electronic device 101. When the first button 201*a* is pressed, a repulsion mechanism constructed in association with the first button 201*a* (for example, a repulsion mechanism by at least one elastic member (e.g., a spring)) may be operated and thus the stylus pen 201 may be separated from the first internal space 212.

Figure 3:
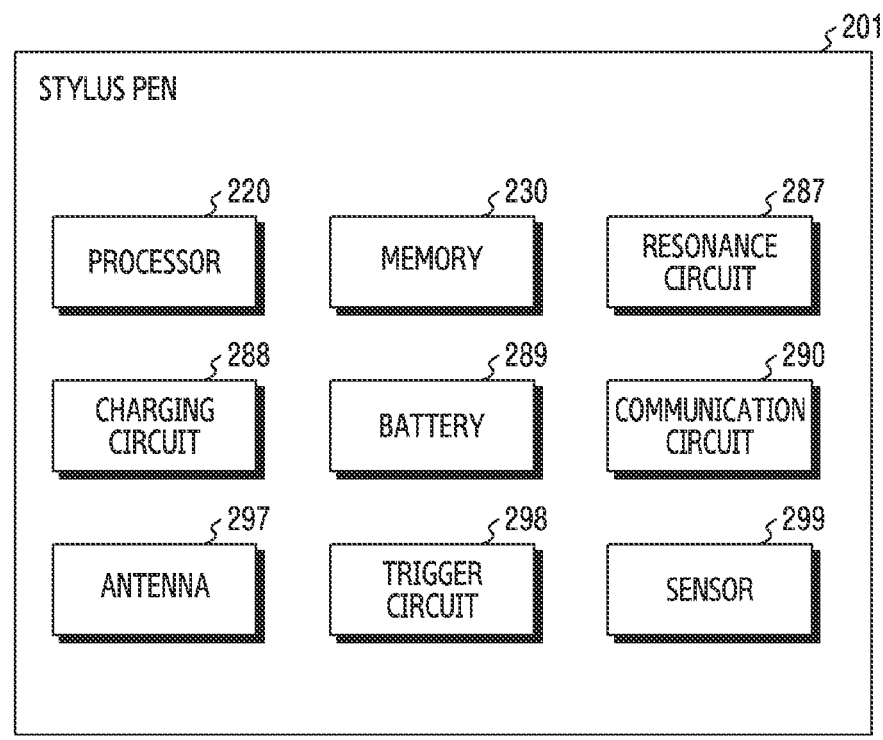
FIG. 3 is a block diagram illustrating a stylus pen according to an example embodiment.

FIG. 3 is a block diagram illustrating a stylus pen 201 (e.g., the stylus pen 201 of FIG. 2) according to an embodiment.

Referring to FIG. 3, the stylus pen 201 of an embodiment may include a processor 220, a memory 230, a resonance circuit 287, a charging circuit 288, a battery 289, a communication circuit 290, an antenna 297, a trigger circuit 298, and a sensor 299. In some embodiments, the processor 220 of the stylus pen 201, at least a portion of the resonance circuit 287, and/or at least a portion of the communication circuit 290 may be constructed on a printed circuit board or in the form of a chip. One or more of the processor 220, the resonance circuit 287, and the communication circuit 290 may be electrically connected, directly or indirectly, to the memory 230, the charging circuit 288, the battery 289, the antenna 297, the trigger circuit 298, and/or the sensor 299.

The processor 220 of an embodiment may include a generic processor configured to execute a customized hardware module or software (e.g., an application program). The processor 220 may include a hardware component (function) (not shown) or a software element (program) (not shown) that includes at least one of the sensor 299 disposed in the stylus pen 201, a data measurement module, an input/output interface, a module for managing a state or environment of the stylus pen 201, or a communication module (e.g., a communication circuit 290). The processor 220 may include, for example, one of hardware, software or firmware, or a combination of two or more. According to an embodiment, the processor 220 may be set to transmit information indicating a pressed state of a button (e.g., a button 337), sensing information acquired by the sensor 299, and/or information (e.g., information associated with a position of the stylus pen 201) determined based on the sensing information, to the electronic device 101 through the communication circuit 290.

The resonance circuit 287 of an embodiment may resonate based on an electromagnetic field signal provided from a digitizer (e.g., the display device 160) of the electronic device 101, and may radiate an electromagnetic resonance (EMR) input signal (or magnetic field and) by the resonance. By using the electromagnetic resonance input signal, the electronic device 101 may check a position of the stylus pen 201 on the electronic device 101. For example, the electronic device 101 may check the position of the stylus pen 201, based on a magnitude of an induced electromotive force (e.g., an output current) provided by the electromagnetic resonance input signal, in each of a plurality of channels (e.g., a plurality of loop coils) within the digitizer. Meanwhile, although a description has been made in which the electronic device 101 and the stylus pen 201 are operated based on an EMR scheme in the above description, this is merely exemplary, and the electronic device 101 may provide a signal being based on an electric field, based on an electrically coupled resonance (ECR) scheme as well. The resonance circuit 287 of the stylus pen 201 may be resonated by an electric field. The electronic device 101 may check an electric potential in a plurality of channels (e.g., electrodes) caused by a resonance in the stylus pen 201, and may check the position of the stylus pen 201, based on the electric potential as well. A person skilled in the art will understand that the stylus pen 201 may be implemented in an active electrostatic (AES) scheme as well, and there is no limitation on the type of implementation. In addition, the electronic device 101 may detect the stylus pen 201, based on a change of a capacitance (self capacitance or mutual capacitance) associated with at least one electrode of a touch panel as well. In this case, the stylus pen 201 may not include the resonance circuit 287 as well.

The memory 230 of an embodiment may store information related to the operation of the stylus pen 201. For example, the information may include information for communication with the electronic device 101 and frequency information related to an input operation of the stylus pen 201. In addition, the memory 230 may store a program (or an application, an algorithm, or a processing loop) for determining information on a position of the stylus pen 201 from sensing data of the sensor 299 as well. The memory 230 may store a communication stack of the communication circuit 290 as well. Depending on implementation, the communication circuit 290 and/or the processor 220 may include a dedicated memory as well.

The resonance circuit 287 of an embodiment may include a coil (or an inductor) and/or a capacitor. The resonance circuit 287 may resonate based on an inputted electric field and/or magnetic field (e.g., an electric field and/or magnetic field provided by the digitizer of the electronic device 101). When the stylus pen 201 transmits a signal in an EMR scheme, the stylus pen 201 may provide a signal including a resonance frequency, based on an electromagnetic field provided from an inductive panel of the electronic device 101. When the stylus pen 201 transmits a signal in an AES scheme, the stylus pen 201 may provide a signal by using capacitive coupling with the electronic device 101. When the stylus pen 201 transmits a signal in an ECR scheme, the stylus pen 201 may provide a signal including a resonance frequency, based on an electric field provided from a capacitive device of the electronic device. According to an embodiment, the resonance circuit 287 may be used to change an intensity or frequency of an electromagnetic field according to a user's operation state. For example, the resonance circuit 287 may present various frequencies for recognizing a hovering input, a drawing input, a button input, or an erasing input. For example, the resonance circuit 287 may present various resonance frequencies according to a combination of connection of a plurality of capacitors, or may present various resonance frequencies, based on a variable inductor and/or a variable capacitor.

When the charging circuit 288 of an embodiment is connected, directly or indirectly, with the resonance circuit 287, based on a switching circuit, the charging circuit 288 may rectify a resonance signal provided from the resonance circuit 287 into a direct current signal, and present to the battery 289. According to an embodiment, the stylus pen 201 may check whether the stylus pen 201 has been inserted into the electronic device 101 by using a voltage level of a direct current signal detected by the charging circuit 288. Or, the stylus pen 201 may check a pattern corresponding to a signal checked by the charging circuit 288, and check whether the stylus pen 201 has been inserted into the electronic device 1010.

The battery 289 of an embodiment may be configured to store power required for an operation of the stylus pen 201. The battery 289 may include, for example, a lithium-ion battery or a capacitor, and may be rechargeable or interchangeable. According to an embodiment, the battery 289 may be charged using power (e.g., a direct current signal (direct current power)) presented from the charging circuit 288.

The communication circuit 290 of an embodiment may be configured to perform a wireless communication function between the stylus pen 201 and a communication module (e.g., the communication module 190 of FIG. 1) of the electronic device (e.g., the electronic device 101 of FIG. 1). According to an embodiment, the communication circuit 290 may transmit state information of the stylus pen 201, input information, and/or information associated with a position, to the electronic device 101, by using a short-distance communication scheme. For example, the communication circuit 290 may transmit direction information (e.g., motion sensor data) of the stylus pen 201 acquired through the trigger circuit 298, voice information inputted through a microphone, or remaining level information of the battery 289, to the electronic device 101. For example, the communication circuit 290 may transmit sensing data acquired from the sensor 299, and/or information associated with the position of the stylus pen 201 checked based on the sensing data, to the electronic device 101. For example, the communication circuit 290 may transmit information on a state of a button (e.g., the button 337 of FIG. 4) disposed in the stylus pen 201, to the electronic device 101. As an example, the short-range communication scheme may include at least one of Bluetooth, Bluetooth low energy (BLE), NFC, and Wi-Fi direct, but there is no limitation on the type thereof.

The antenna 297 of an embodiment may be used to transmit a signal or power to the outside (e.g., the electronic device 101), or receive from the outside. According to an embodiment, the stylus pen 201 may include a plurality of antennas 297, and may select at least one antenna 297 suitable for a communication scheme among them. Through the selected at least one antenna 297, the communication circuit 290 may exchange a signal or power with an external electronic device.

The trigger circuit 298 of an embodiment may include at least one button (e.g., the button 337 of FIG. 4) or the sensor circuit 299. According to an embodiment, the processor 220 may check an input scheme (e.g., touch or press), or a type (for example, an EMR button or a BLE button), of a button of the stylus pen 201. According to an embodiment, the trigger circuit 298 may transmit a trigger signal to the electronic device 101, by using an input signal of a button or a signal through the sensor 299.

The sensor 299 of an embodiment may include an acceleration sensor, a gyro sensor, and/or a geomagnetic sensor. The acceleration sensor may sense information about a linear motion of the stylus pen 201 and/or an acceleration of the stylus pen 201 in three axes. The gyro sensor may sense information related to rotation of the stylus pen 201. The geomagnetic sensor may sense information about a direction in which the stylus pen 201 proceeds in an absolute coordinate system. According to an embodiment, the sensor 299 may include at least one of not only a sensor for measuring a motion, but also a sensor capable of providing an electrical signal or data value corresponding to an internal operating state of the stylus pen 201 or an external environmental state, for example, a battery 289 remaining level detection sensor, a pressure sensor, an optical sensor, a temperature sensor, and/or a biometric sensor. According to an embodiment, the processor 220 may transmit information acquired from the sensor 299, to the electronic device 101 through the communication circuit 290. Or, the processor 220 may transmit information (e.g., a coordinate of the stylus pen 201 and/or a displacement of the stylus pen 201) associated with a position of the stylus pen 201, to the electronic device 101 through the communication circuit 290, based on the information acquired from the sensor 299 as well.

Figure 4:
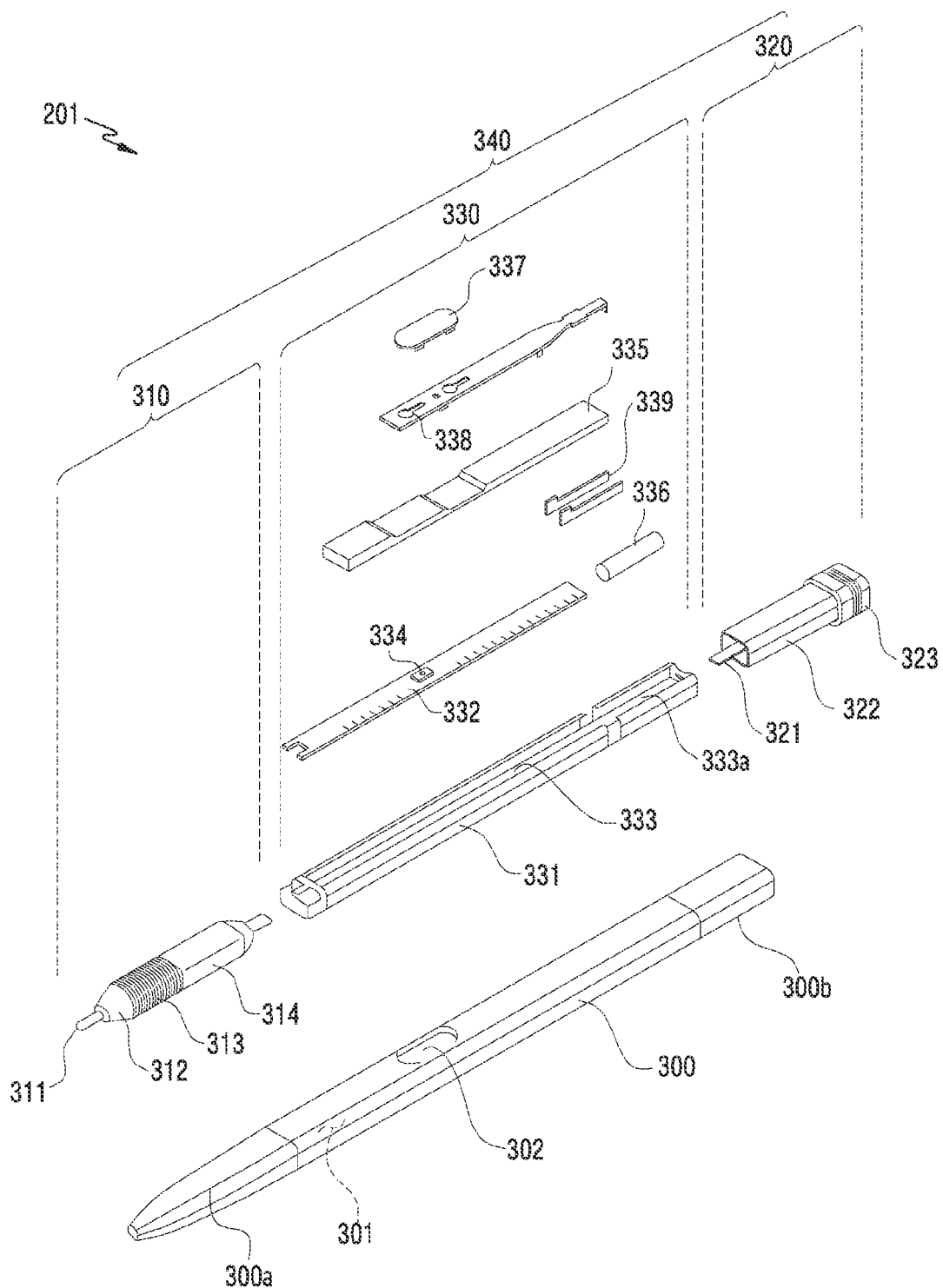
FIG. 4 is an exploded perspective view of a stylus pen according to an example embodiment.

FIG. 4 is an exploded perspective view of a stylus pen 201 (e.g., the stylus pen 201 of FIG. 2) according to an embodiment.

Referring to FIG. 4, the stylus pen 201 may include a pen housing 300 constituting an outer shape of the stylus pen 201, and an inner assembly 340 inside the pen housing 300. In an illustrated embodiment, the inner assembly 340 may be inserted into the pen housing 300 by a single assembly operation, in a state in which several components mounted inside the stylus pen 201 are coupled together.

The pen housing 300 may have an elongated shape between a first end 300a and a second end 300b, and may include a second internal space 301 therein. The pen housing 300 may have an elliptical cross-section comprising a major axis and a minor axis, and may be formed in an elliptical column shape as a whole. The first internal space 212 of the electronic device 101 described above in FIG. 2 may also have an elliptical cross-section corresponding to the shape of the pen housing 300. According to an embodiment, at least a portion of the pen housing 300 may include a synthetic resin (e.g., plastic) and/or a metallic material (e.g., aluminum). According to an embodiment, the first end 300a of the pen housing 300 may be made of a synthetic resin material. Another embodiment may be applied to the material of the pen housing 300.

The inner assembly 340 may have an elongated shape corresponding to the shape of the pen housing 300. The inner assembly 340 may be largely divided into three types along a longitudinal direction. For example, the inner assembly 340 may include a coil part 310 disposed in a position corresponding to the first end 300a of the pen housing 300, an ejection member 320 disposed in a position corresponding to the second end 300b of the pen housing 300, and a circuit board part 330 disposed in a position corresponding to the body of the pen housing 300.

The coil part 310 may include a pen tip 311 exposed to the outside of the first end 300a when the inner assembly 340 is completely inserted into the pen housing 300, a packing ring 312, a coil 313 wound at a plurality of times, and/or a pen pressure sensing unit 314 for acquiring a change of a pressure according to the pressurization of the pen tip 311. The packing ring 312 may include epoxy, rubber, urethane, or silicone. The packing ring 312 may be disposed for the purpose of waterproofing and dustproofing, and may protect the coil part 310 and the circuit board part 330 from immersion or dust. According to an embodiment, the coil 313 may form a resonance frequency in a set frequency band (e.g., 500 kHz), and may adjust the resonance frequency formed by the coil 313 in a range of a predetermined extent in combination with at least one element (e.g., a capacitive element).

The ejection member 320 may include a construction for withdrawing the stylus pen 201 from a first internal space (e.g., the first internal space 212 of FIG. 2) of an electronic device (e.g., the electronic device 101 of FIG. 2). According to an embodiment, the ejection member 320 may include a shaft 321, an ejection body 322 disposed around the shaft 321 and forming an overall appearance of the ejection member 320, and a button part 323 (e.g., the first button 201a of FIG. 2). When the inner assembly 340 is fully inserted into the pen housing 300, a portion including the shaft 321 and the ejection body 322 may be surrounded by the second end 300b of the pen housing 300, and at least a portion of the button part 323 may be exposed to the outside of the second end 300b. A plurality of components not shown, for example, cam members or elastic members, may be disposed in the ejection body 322, to form a push-pull structure. In an embodiment, the button part 323 may be substantially coupled to the shaft 321 and perform a linear reciprocating motion with respect to the ejection body 322. According to an embodiment, the button part 323 may include a button having a locking structure wherein a user may take out the stylus pen 201 by using a fingernail. According to an embodiment, the stylus pen 201 may include a sensor detecting a linear reciprocating motion of the shaft 321, thereby presenting another input scheme as well.

The circuit board part 330 may include a printed circuit board 332, a base 331 surrounding at least one surface of the printed circuit board 332, a switch 334, a second button 337, a support member 338, and an antenna. According to an embodiment, a substrate seating part 333 on which the printed circuit board 332 is disposed may be formed on an upper surface of the base 331, and the printed circuit board 332 may be seated on and be fixed to the substrate seating part 333. According to an embodiment, the printed circuit board 332 may include a first surface and a second surface. A variable capacitance capacitor (not shown) or switch 334 connected to the coil 313 may be disposed on the first surface. A charging circuit (not shown) (e.g., the charging circuit 288 of FIG. 3), a battery 336 (e.g., the battery 289 of FIG. 3), or a communication circuit (not shown) (e.g., the communication circuit 290 of FIG. 3) may be disposed on the second surface. Here, according to an embodiment, the first surface and second surface of the printed circuit board 332 may indicate different laminated surfaces in a structure laminated up and down, and according to another embodiment, may indicate different portions of the printed circuit board disposed along the longitudinal direction of the printed circuit board 332. The battery 336 may include an electric double layered capacitor (EDLC) or a lithium ion battery. A charging circuit (not shown) (e.g., the charging circuit 288 of FIG. 3) is positioned between the coil 313 and the battery, and may include a voltage detector circuitry and a rectifier. Here, the battery 336 may not necessarily be disposed on the second surface of the printed circuit board 332. The position of the battery 336 may be variously set according to various mounting structures of the circuit board 332, and may be arranged in a position different from that shown in the drawings.

The antenna 399 may include an antenna embedded in an antenna structure 339 and/or the printed circuit board 332 as in the example shown in FIG. 4. According to an embodiment, the switch 334 may be disposed on the printed circuit board 332. The second button 337 disposed on the stylus pen 201 may be used to press the switch 334 and may be exposed to the outside through a side opening 302 of the pen housing 300. While the second button 337 is supported by the support member 338, when there is no external force acting on the second button 337, the support member 338 may present an elastic restoring force and restore or maintain the second button 337 in a state of being disposed in a predetermined position. On the other hand, the second button 337 may be implemented in any one of a physical key, touch key, motion key, pressure key, or key less scheme, and there is no limitation on the form of implementation of the button.

The circuit board part 330 may include, for example, a packing ring such as an O-ring. According to an embodiment, the O-ring made of an elastic material may be disposed at both ends of the base 331 and thus a sealing structure may be formed between the base 331 and the pen housing 300. In some embodiment, the support member 338 may partially adhere to an inner wall of the pen housing 300 around the side opening 302 and form a sealing structure. For example, at least a portion of the circuit board part 330 may include a waterproof and dustproof structure similar to the packing ring 312 of the coil part 310.

The stylus pen 201 may include a battery seating part 333a in which the battery 336 is disposed on an upper surface of the base 331. The battery 336 that may be mounted on the battery seating part 333a may include, for example, a cylinder type battery.

The stylus pen 201 may include a microphone (not shown) and/or a speaker (not shown). The microphone and/or the speaker may be directly connected to the printed circuit board 332 or be connected to a separate flexible printed circuit board (FPCB) (not shown) connected to the printed circuit board 332. The microphone and/or the speaker may be disposed on the same line as the second button 337 of the stylus pen 201 in the same direction.

Figure 5:
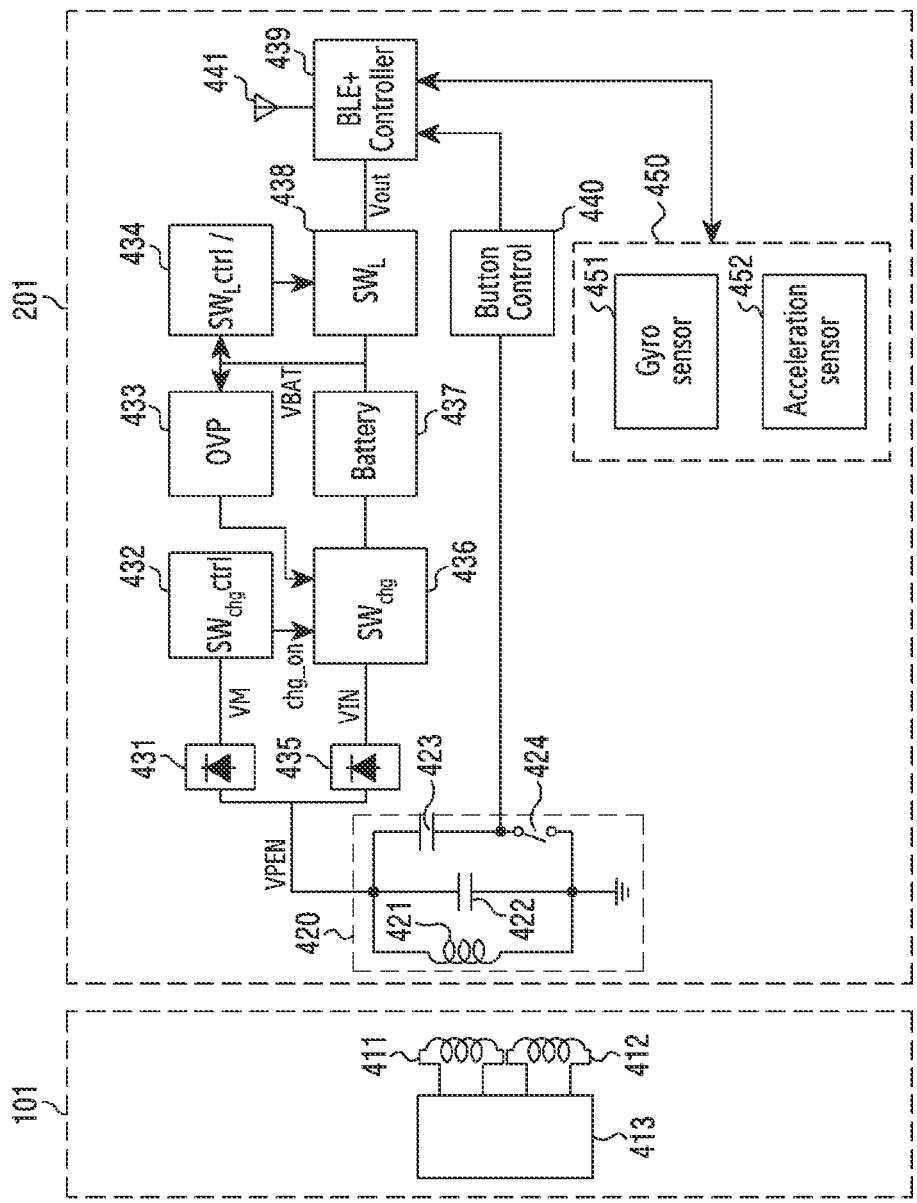
FIG. 5 is a diagram illustrating a construction of an electronic device and a stylus pen according to various example embodiments.

FIG. 5 is a diagram illustrating a construction of the electronic device 101 and the stylus pen 201 according to various embodiments.

Referring to FIG. 5, according to various embodiments, the electronic device 101 (e.g., the electronic device 100 of FIG. 1 or the electronic device 101 of FIG. 2) may include a wireless charging controller 413 (e.g., a fan controller) and at least one coil 411 and 412.

The wireless charging controller 413 may include the at least one coil 411 and 412. The wireless charging controller 413 may present charging power to the stylus pen 201 (e.g., the stylus pen 201 of FIG. 2) through the at least one coil 411 and 412. When the stylus pen 201 is inserted into an accommodation space (e.g., the first internal space 212 of FIG. 2) of the electronic device 101, the at least one coil 411 and 412 may be disposed in a position physically adjacent, directly or indirectly, to a coil 421 of the stylus pen 201, but there is no limitation on an arrangement position. On the other hand, insertion into the accommodation space is merely exemplary, and the electronic device 101 may include a region (or a space) in which the stylus pen 201 may be mounted (or attached) in addition to the accommodation space as well. In this case, the stylus pen 201 may be detachably attached to a corresponding region (or space). The operation when the stylus pen 201 is positioned in the accommodation space in the present disclosure may be performed when it is attached to a mounting region (or space) in another embodiment as well. At least some functions of the wireless charging controller 413 may be performed by a processor (e.g., the processor 120 of FIG. 1), or the wireless charging controller 413 and the processor 120 may be implemented to be integrated and perform at least some functions as well. In the present disclosure, the expression that the wireless charging controller 413 performs a specific operation may indicate that it is performed by the processor (e.g., the processor 120 of FIG. 1 or the processor 220 of FIG. 2), or is performed by a control circuit independent from the processor (e.g., the processor 120 of FIG. 1 or the processor 220 of FIG. 2). The wireless charging controller 413 may include a control circuit (e.g., the control circuit independent from the processor), an inverter, and/or an amplifier, in addition to the at least one coil 411 and 412. As described above, the wireless charging controller 413 may not include the control circuit, and in this case, may present a signal for charging to the at least one coil 411 and 412 according to the control of the processor (e.g., the processor 120 of FIG. 1 or the processor 220 of FIG. 2).

According to various embodiments, the wireless charging controller 413 may present a signal having a pattern through the at least one coil 411 and 412 as well. The pattern is shared in advance with the stylus pen 201 for the sake of control of the stylus pen 201, and may include, for example, a charging start instruction pattern, a charging end instruction pattern, and a detection pattern, and there is no limitation on its type. The coils 411 and 412 for presenting a charging signal, or a signal having a pattern for control are illustrated as two, but this is merely exemplary, and there is no limitation on its number.

According to various embodiments, the stylus pen 201 may include a resonance circuit 420, at least one rectifier 431 and 435, a charging switch controller ($SW_{chg}$ ctrl) 432, an over-voltage protection circuit (OVP) 433, a load switch controller ($SW_L$ ctrl) 434, a charging switch ($SW_{chg}$) 436, a battery 437 (e.g., the battery 289 of FIG. 3), a load switch ($SW_L$) 438, a BLE communication circuit and controller (BLE+controller) 439, a button control circuit 440, and a sensor circuit 450 (e.g., the sensor 299 of FIG. 3).

The resonance circuit 420 (e.g., the resonance circuit 287 of FIG. 3) of the stylus pen 201 may include the coil 421, at least one capacitor 422 and 423, and/or a switch 424. When the switch 424 is in an Off state, the coil 421 and the capacitor 422 may constitute the resonance circuit, and when the switch 424 is in an On state, the coil 421 and the capacitors 422 and 423 may constitute the resonance circuit. Accordingly, a resonance frequency of the resonance circuit 420 may be changed according to the On/Off state of the switch 424. For example, the electronic device 101 may check the On/Off state of the switch 424, based on a frequency of a signal from the stylus pen 201. For example, when the button 337 of the stylus pen 201 is pressed/released, the switch 424 may turn On/Off, and the electronic device 101 may check whether the button 337 of the stylus pen 201 is pressed, based on a frequency of a received signal checked through a digitizer.

According to various embodiments, the at least one rectifier 431 and 435 may rectify and output an AC waveform signal (VPEN) outputted from the resonance circuit 420. The charging switch controller ($SW_{chg}$ ctrl) 432 may receive a rectified signal (VM) outputted from the rectifier 431. Based on the rectified signal (VM), the charging switch controller 432 may check whether a signal provided from the resonance circuit 420 is a signal for charging or a signal for position detection. For example, the charging switch controller 432 may check whether the signal provided from the resonance circuit 420 is the signal for charging or the signal for position detection, based on, for example, a magnitude of a voltage of the rectified signal (VM). Or, the charging switch controller 432 may check whether a signal having a charging start pattern is inputted based on a waveform of the rectified signal (VM) as well.

According to various embodiments, when it is checked that the signal is for charging, the charging switch controller 432 may control the charging switch ($SW_{chg}$) 436 to be in an On state. Or, when a signal having a charging start pattern is detected, the charging switch controller 432 may control the charging switch ($SW_{chg}$) 436 to be in the On state. The charging switch controller 432 may transmit a charging start signal (chg_on) to the charging switch 436. In this case, the rectified signal (VIN) may be transmitted to the battery 437 (e.g., the battery 289 of FIG. 3) through the charging switch 436. The battery 437 may be charged using the received rectified signal (VIN). The over-voltage protection circuit (OVP) 433 may check a battery voltage (VBAT), and may control the charging switch 436 to be in an Off state when the battery voltage exceeds an over-voltage threshold.

According to various embodiments, when it is checked that the battery voltage exceeds an operating voltage threshold, the load switch controller ($SW_L$ ctrl) 434 may control the load switch ($SW_L$) 438 to be in an On state. When the load switch 438 is in the On state, power from the battery 437 may be delivered to the BLE communication circuit and controller (BLE+controller) 439 (e.g., the communication circuit 290 and processor 220 of FIG. 3A). The BLE communication circuit and controller 439 may operate using the received power. When a distance between the stylus pen 201 and the electronic device 101 is greater than a threshold distance, the button control circuit 440 may deliver information about an input of a button (e.g., the button 337) to the BLE communication circuit and controller 439. The BLE communication circuit and controller 439 may transmit the received information about the button input to the electronic device 101 through an antenna 441 (e.g., the antenna 297 of FIG. 3). The sensor circuit 550 (e.g., the sensor 299 of FIG. 3) may include a gyro sensor 451 and/or an acceleration sensor 452. Sensing data acquired by the gyro sensor 451 and/or the acceleration sensor 452 may be delivered to the BLE communication circuit and controller 439. The BLE communication circuit and controller 439 may transmit a communication signal including the received sensing data to the electronic device 101 through the antenna 441. Or, the BLE communication circuit and controller 439 may check information (e.g., a coordinate and/or displacement of the stylus pen 201) associated with a position of the stylus pen 201, which is checked based on the received sensing data. The BLE communication circuit and controller 439 may transmit the checked information associated with the position of the stylus pen 201, to the electronic device 101, through the antenna 441. According to various embodiments, when the stylus pen 201 is withdrawn from the electronic device 101, the BLE communication circuit and controller 439 may activate the acceleration sensor 452. When the button (e.g., the button 337) is pressed, the BLE communication circuit and controller 439 may activate the gyro sensor 451. On the other hand, an activation time point is merely exemplary, and there is no limitation on an activation time point for each sensor. In addition, the sensor circuit 550 may further include a geomagnetic sensor as well. When only the acceleration sensor 452 is activated, the stylus pen 201 may present acceleration information measured by the acceleration sensor 452 to the electronic device 101, and the electronic device 101 may operate based concurrently on the position and acceleration information of the stylus pen 201 that are checked based on a pen signal as well.

Figure 6:
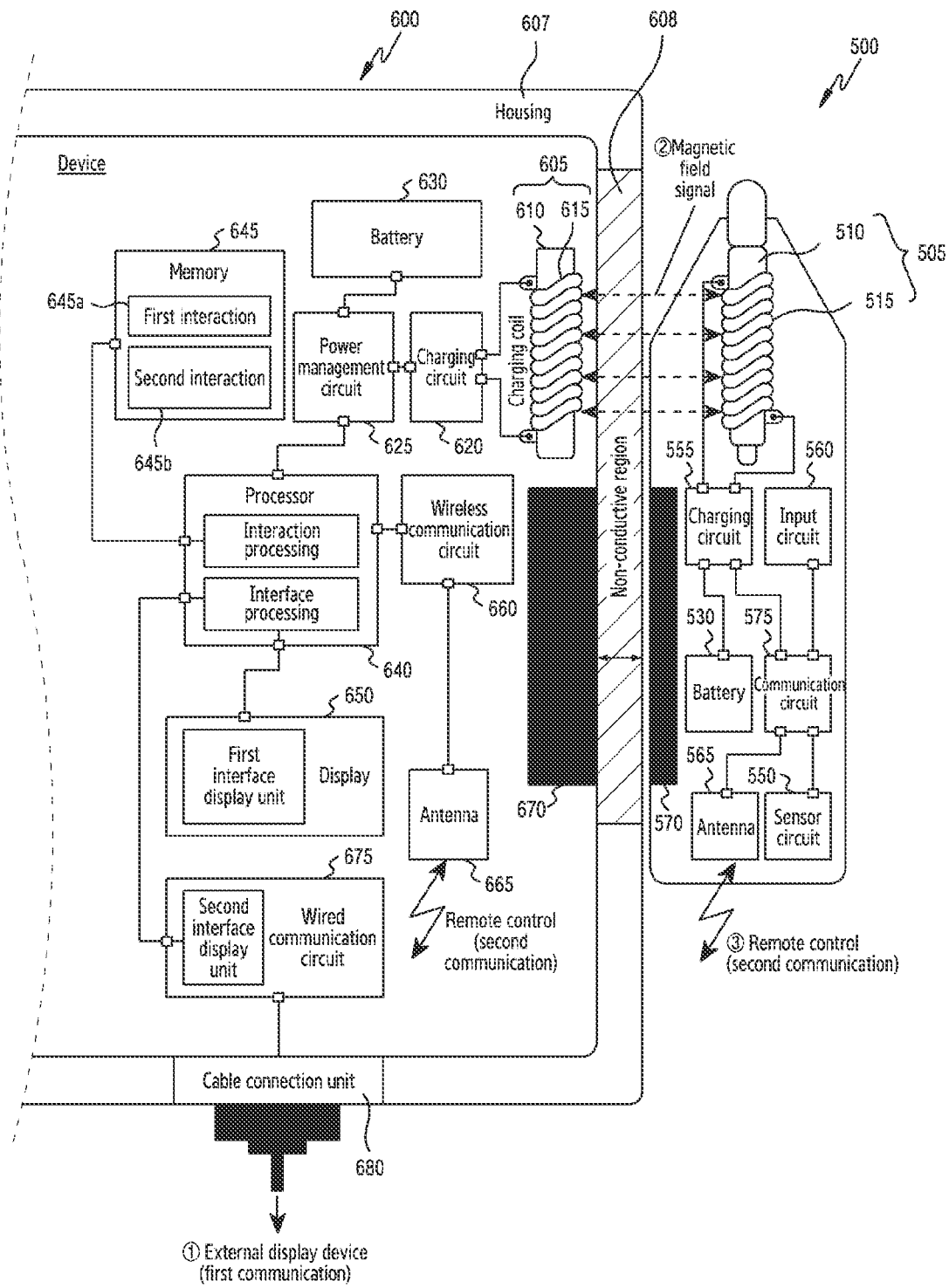
FIG. 6 is a diagram illustrating a remote input device (e.g., a stylus pen) attached to the outside of an electronic device according to various example embodiments.
Figure 7:
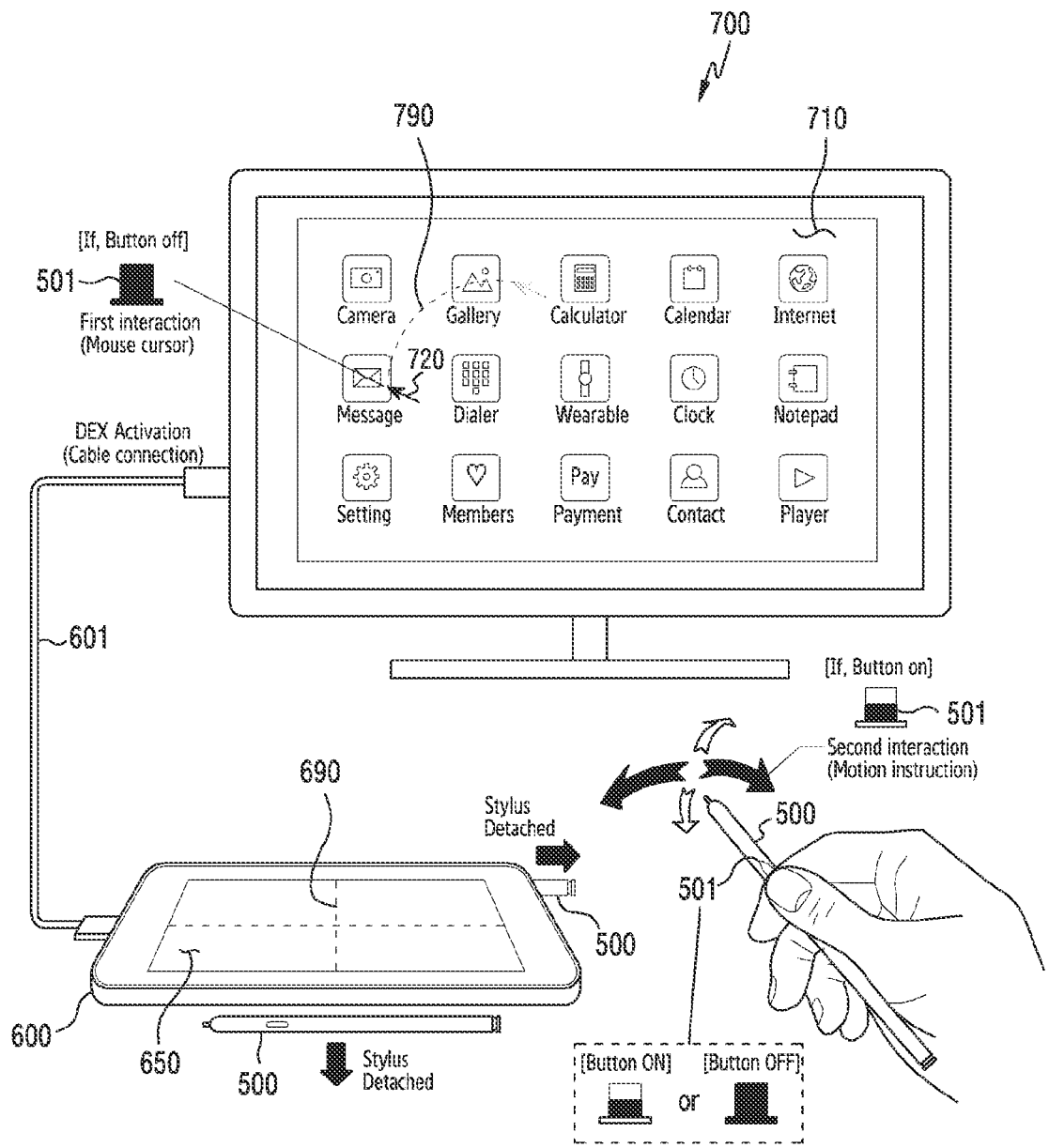
FIG. 7 is a diagram illustrating an electronic device and an external display device connected in a DEX mode, and an operation of presenting a plurality of remote interactions (e.g., an air mouse mode and an air action mode) for a remote input device (e.g., a stylus pen) according to various embodiments.

FIG. 6 is a diagram illustrating that a remote input device 500 (e.g., a stylus pen) is attached to the outside of an electronic device 600 according to various embodiments. FIG. 7 is a diagram illustrating the electronic device 600 and an external display device 700 connected in a DEX mode, and an operation of presenting a plurality of remote interactions (e.g., an air mouse mode and an air action mode) for the remote input device 500 (e.g., the stylus pen) according to various embodiments.

Referring to FIG. 6 and FIG. 7, the electronic device 600 is a master device and may be communicatively connected to the remote input device 500 (hereinafter, referred to as a 'stylus pen 500'). Also, the electronic device 600 may be connected to the external display device 700 in the DEX mode.

The electronic device 600 may present the plurality of remote interactions for the stylus pen 500, based on a communication connection activation state (e.g., the DEX mode) for the external display device 700 and a detachment operation (e.g., a detached state) of the stylus pen 500. In this case, the electronic device 600 may receive a trigger input (e.g., a button 501 input signal) from the stylus pen 500. In response to the received trigger input (e.g., the button 501 input signal), the electronic device 600 may present a first remote interaction (e.g., an air mouse mode) for a coordinate input track. Also, when there is the trigger input received from the stylus pen 500, the electronic device 600 may present a second remote interaction (e.g., the air action mode) for executing a motion instruction.

The electronic device 600 may display an image in front through a display 650, and may recognize a remote control input of the stylus pen 500 by using a sensor signal from a sensor (e.g., the sensor module 176 and the camera module 180 of FIG. 1). The sensor (e.g., the sensor module 176 of FIG. 1) of the electronic device 600 may detect an operating state (e.g., power or temperature) of the electronic device 600, or an external environmental state (e.g., a user state), and provide an electrical signal or data value corresponding to the detected state. According to an embodiment, the sensor (e.g., the sensor module 176 of FIG. 1) may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The electronic device 600 may include a first wireless charging coil 605, a charging circuit 620, a power management circuit 625 (e.g., the power management module 188 of FIG. 1), a battery 630 (e.g., the battery 189 of FIG. 1), a processor 640 (e.g., the processor 120 of FIG. 1), a memory 645 (e.g., the memory 130 of FIG. 1), the display 650 (e.g., the display device 160 of FIG. 1), a wireless communication circuit 660 (e.g., the wireless communication module 192, comprising communication circuitry, of FIG. 1), an antenna 665 (e.g., the antenna module 197, including at least one antenna, of FIG. 1), a magnet 670, a wired communication circuit 675 (e.g., the wired communication module 194 of FIG. 1), and a cable connection unit 680 (e.g., the connection terminal 178 of FIG. 1).

The power management circuit 625 (e.g., the power management module 188 of FIG. 1) may be connected to the charging circuit 620, the battery 630, and the processor 640. The power management circuit 625 may manage power supplied to the electronic device 600. As an embodiment, the power management circuit 625 may be implemented as a part of a power management integrated circuit (PMIC).

The battery 630 (e.g., the battery 189 of FIG. 1) may supply power to at least one component of the electronic device 600. As an embodiment, the battery 630 may include a non-rechargeable primary cell, a rechargeable secondary cell, or a fuel cell.

The wireless communication circuit 660 (e.g., the wireless communication module 192 of FIG. 1) may support establishment of a wireless communication channel between the electronic device 600 and an external device (e.g., the stylus pen 500), another electronic device, and a server (e.g., the server 180 of FIG. 1), and communication execution through the established wireless communication channel. The wireless communication circuit 660 (e.g., the wireless communication module 192 of FIG. 1) may operate independently of the processor 640 (e.g., the processor 120 of FIG. 1). The wireless communication circuit 660 (e.g., the wireless communication module 192 of FIG. 1) may include one or more communication processors supporting wireless communication. Each "module" herein may comprise circuitry.

The wired communication circuit 675 (e.g., the wired communication module 194 of FIG. 1) may support establishment of a direct (e.g., wired) communication channel between the electronic device 600 and the external display device 700, another electronic device, and the server (e.g., the server 180 of FIG. 1), and communication execution through the established communication channel. The wired communication circuit 675 (e.g., the wired communication module 194 of FIG. 1) may operate independently of the processor 640 (e.g., the processor 120 of FIG. 1). In the case of USB communication or HDMI communication, a wired communication circuit unit may be included within the processor (e.g., the processor 120 of FIG. 1). In the case of DP communication, it may be operated through an independent wired communication circuit. In the case of 8K high quality, the wired communication module 194 may operate independently of the processor 640 (e.g., the processor 120 of FIG. 1).

The wired communication circuit 675 (e.g., the wired communication module 194 of FIG. 1) may include one or more communication processors supporting direct (e.g., wired) communication.

The memory 645 (e.g., the memory 130 of FIG. 1) may store various data (e.g., first interaction data and second interaction data) used by at least one component (e.g., the processor 640) of the electronic device 600. The data may include, for example, software (e.g., the program 140 of FIG. 1), and input data or output data about a command related thereto. The memory 645 (e.g., the memory 130 of FIG. 1) may include a volatile memory (e.g., the volatile memory 132 or the non-volatile memory 134 of FIG. 1).

The antenna 665 (e.g., the antenna module 197 of FIG. 1) may transmit a signal or power to the outside (e.g., the stylus pen 500 or an external electronic device), or receive a signal or power from the outside. According to an embodiment, the antenna 665 (e.g., the antenna module 197 of FIG. 1) may include one antenna including a radiator that is formed of a conductor or conductive pattern formed on a substrate (e.g., a PCB). According to an embodiment, the antenna 665 (e.g., the antenna module 197 of FIG. 1) may include a plurality of antennas. In this case, at least one antenna suitable for a communication scheme used in the stylus pen 500, a wearable device 500, and a communication network (e.g., the first network 198 and/or the second network 199 of FIG. 1) may be selected.

The display 650 (e.g., the display device 160 of FIG. 1) may visually present information to the outside (e.g., a user) of the electronic device 600. The display 650 (e.g., the display device 160 of FIG. 1) may include, for example, a hologram device or a projector and a control circuit for controlling the corresponding device. According to an embodiment, the display 650 (e.g., the display device 160 of FIG. 1) may include touch circuitry configured to sense a touch, or a sensor circuit (e.g., a pressure sensor) configured to measure an intensity of a force provided by the touch. As an embodiment, the display 650 may include a digitizer panel to recognize the stylus pen 500. As an embodiment, the display 650 may include a frequency-variable touch circuit to identify a finger touch and the stylus pen 500.

The stylus pen 500 may include a second wireless charging coil 505, a charging circuit 555 (e.g., the charging circuit 288 of FIG. 3), a battery 530 (e.g., the battery 289 of FIG. 3), an input circuit 560 (e.g., the trigger circuit 298 of FIG. 3), a sensor circuit 550 (e.g., the sensor 299 of FIG. 3 and the sensor circuit 450 of FIG. 5), a communication circuit 575 (e.g., the communication circuit 290 of FIG. 3), an antenna 565 (e.g., the antenna 297 of FIG. 3 and the antenna 441 of FIG. 5), and a magnet 570.

For example, the first magnet 670 and the second magnet 570 may include magnets having a plurality of polarities (e.g., an N pole and an S pole), wherein the stylus pen 500 may be attached to a specified position of the electronic device 600.

The stylus pen 500 may be attached to the outside of the electronic device 600 by using the magnet 670 included in the electronic device 600 and the magnet 570 included in the stylus pen 500. The housing 607 of the electronic device 600 may include a non-conductive region 608, and the stylus pen 500 may be attached with the non-conductive region 608 interposed therebetween. The stylus pen 500 may be attached/detached from the outside of the electronic device 600, and the electronic device 600 may recognize an attachment and detachment state of the stylus pen 500.

As an embodiment, a coil 615 may be wound around a ferrite core 610 and constitute the first wireless charging coil 605 of the electronic device. As an embodiment, a coil 415 (e.g., the coil 421 of FIG. 5) is wound around a ferrite core 410 and constitute the second wireless charging coil 505 of the stylus pen 500. The electronic device 600 may detect the attachment/detachment state of the stylus pen 500 by using the magnet 670 and the first wireless charging coil 605 inside the housing.

A magnetic field signal may be provided between the first wireless charging coil 605 of the electronic device 600 and the second charging coil 410 and 615 of the stylus pen 500. Based on a change in the magnetic field signal between the first wireless charging coil 605 and the second wireless charging coil 505, the electronic device 600 may detect the attachment/detachment state of the stylus pen 500. As an embodiment, when the stylus pen 500 is detached from the electronic device 600, a matching state between the first wireless charging coil 605 of the electronic device 600 and the second wireless charging coil 505 of the stylus pen 500 may be changed. The electronic device 600 may receive an electrical signal equal to or greater than a threshold voltage through provision of an induced magnetic field based on the change of the matching state. The electronic device 600 may receive an electrical signal provided by the first wireless charging coil 605 through the charging circuit 620 and the processor 640, and may determine a detachment state of the stylus pen 500, based on the received electrical signal. When the electrical signal greater than or equal to the threshold voltage is provided through the first wireless charging coil 605, the electronic device 600 may recognize that the stylus pen 500 is attached (or accommodated). As another example, the stylus pen 500 may be accommodated/removed from the inside of the electronic device 101. When the stylus pen 500 is accommodated in or detached from the inside of the electronic device 101, the electronic device 600 may detect the accommodated or detached state of the stylus pen 500 by using the first wireless charging coil 605.

The first wireless charging coil 605 of the electronic device 600 and the second wireless charging coil 505 of the stylus pen 500 may transmit or receive a magnetic field signal. When the second wireless charging coil 505 of the stylus pen 500 approaches the first wireless charging coil 605 of the electronic device 600, a resonance signal (induced magnetic field signal) is provided. Based on the resonance signal, it is possible to check whether the stylus pen 500 is attached/detached. When the stylus pen 500 is detached (or separated), a resonance signal is not provided as a distance between the electronic device 600 and the stylus pen 500 increases, so the electronic device 600 may detect the detachment of the stylus pen 500.

In a state in which the stylus pen 500 is attached (or accommodated), the electronic device 600 and the stylus pen 500 may continuously transmit/receive a communication signal including charge power and data through the matched first wireless charging coil 605 and second wireless charging coil 505. Meanwhile, when an electrical signal equal to or greater than a threshold voltage is not received through the first wireless charging coil 605, the electronic device 600 may recognize that the stylus pen 500 is in a detached (or separated) state.

The first wireless charging coil 605 of the electronic device 600 and the second wireless charging coil 505 of the stylus pen 500 may be attached to a matching position by the first magnet 670 and the second magnet 570. The electronic device 600 may detect an attachment operation of the stylus 500 (e.g., a remote input device). The electronic device 600 may execute a charging operation of the stylus pen 500 by using the first wireless charging coil 605.

The electronic device 600 may share power of the batteries 630 and 465 with the stylus pen 500 through an induced magnetic field provided by the first wireless charging coil 605 of the matching position. The electronic device 600 may store/load an execution instruction corresponding to DEX mode activation, remote control activation information of the stylus pen 500, and a remote control input (button input and gesture input), through the memory 645.

A first terminal of a cable 601 may be connected to the cable connection unit 680 (e.g., the connection terminal 178 of FIG. 1). A second terminal of the cable 601 may be connected to the external display device 700. That is, the electronic device 600 and the display device 700 may be connected through the cable 601 and operate in a DEX mode. As an embodiment, the cable 601 may be a USB 3.0 cable, a USB type-C cable, an HDMI cable, a DP cable, or a combination of USB type-C and HDMI schemes.

When the electronic device 600 operates in the DEX mode, the display device 700 may present an image presented from the electronic device 600. That is, a user interface similar to a Windows operating system (OS) or a Chrome operating system (OS) may be presented through the display device 700 connected to the electronic device 600, thereby presenting a user environment similar to a PC through a mobile communication device.

As illustrated in FIG. 7, the electronic device 600 may detect a detachment operation of the stylus pen 500 (e.g., a remote input device). When the electronic device 600 detects the detachment operation of the stylus pen 500, the electronic device 600 may recognize the movement of the stylus pen 500 by using a sensor module (e.g., the sensor module 176, including at least one sensor, of FIG. 1) and/or a camera module (e.g., the camera the module 180 of FIG. 1). Here, the electronic device 600 may measure a distance to the stylus pen 500.

As an embodiment, the electronic device 600 may recognize a gesture movement of the stylus pen 500 through an infrared optical device (not shown), and acknowledge an operation of the stylus pen 500, based on the movement of the stylus pen 500. By outputting an infrared signal through a transmitter of the infrared optical device and receiving a reflected infrared signal through a receiver, the electronic device 600 may detect/determine distance information with the stylus pen 500 and the gesture movement.

The electronic device 600 may detect a connection between the external display device 700 and the cable 601. When the electronic device 600 detects the connection of the cable 601 to the display device 700, first communication (e.g., HDMI communication and USB type-C communication) may be activated. The electronic device 600 may output the first interface 690 through the internal display 650. In addition, the electronic device 600 may output the second interface 790 through the external display device 700.

Also, the electronic device 600 may receive a touch control input for the second interface 790 through the first interface 690. In this case, the internal display 650 displaying the first interface 690 may include a touch screen for detecting a user's touch input.

Figure 8:
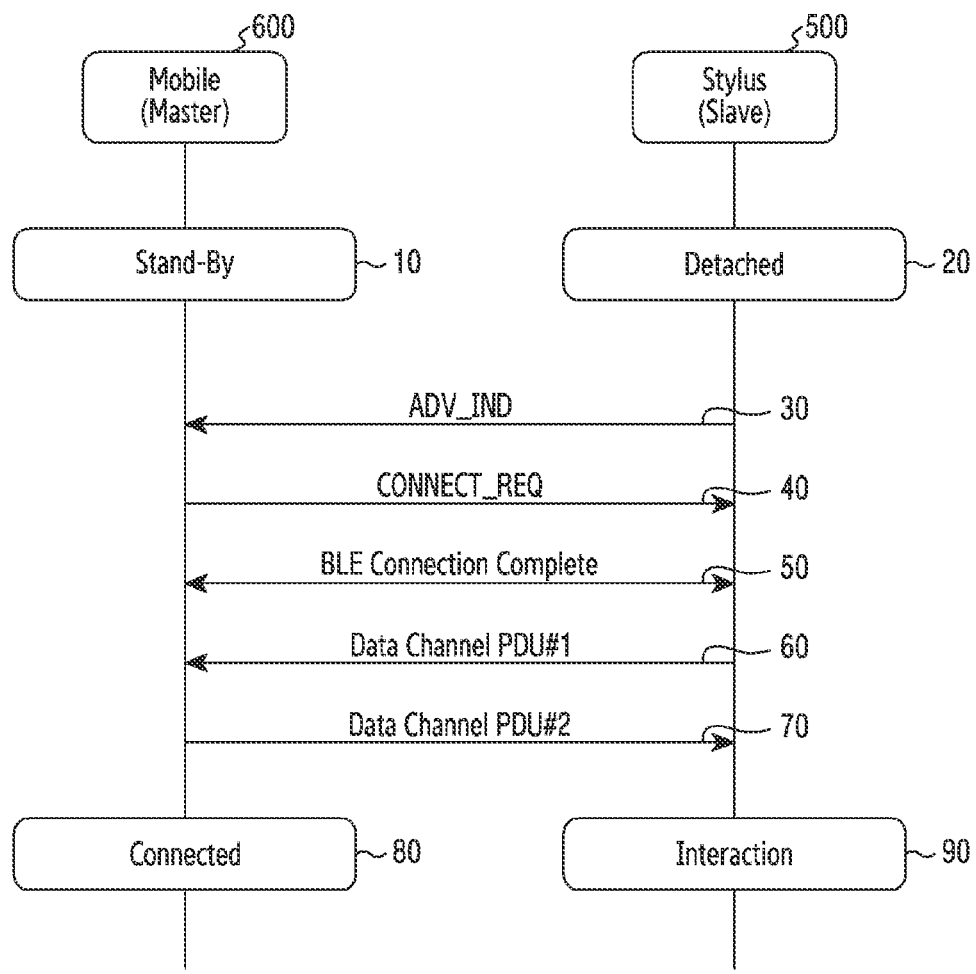
FIG. 8 is a flowchart illustrating an operation of communication connection between an electronic device and a remote input device (e.g., a stylus pen) according to various example embodiments.
Figure 9A:
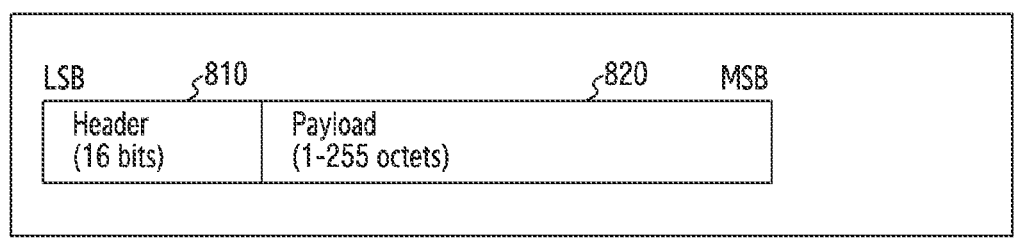
FIG. 9A is a diagram illustrating an advertising channel PDU according to various embodiments.
Figure 9B:
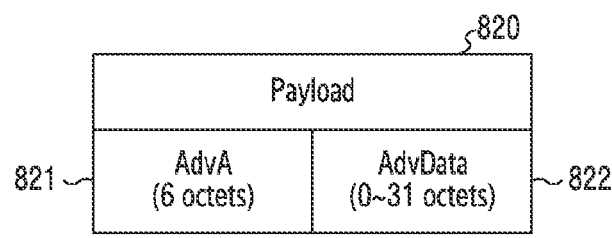
FIG. 9B is a diagram illustrating an advertising PDU payload according to various example embodiments.

FIG. 8 is a flowchart illustrating a communication connection operation between the electronic device 600 and a remote input device (e.g., the stylus pen 500) according to various embodiments. FIG. 9A is a diagram illustrating an advertising channel PDU according to various embodiments. FIG. 9B is a diagram illustrating an advertising PDU payload according to various embodiments. FIG. 9C is a diagram illustrating an advertisement packet according to various embodiments.

Referring to FIG. 8 and FIG. 9A to FIG. 9C, when the electronic device 600 detects a detachment operation of the stylus pen 500 through a change of a magnetic field, the electronic device 600 may activate second communication (e.g., BLE communication), that is, a second communication connection state from a stand-by state to a connected state.

As an embodiment, the electronic device 600 may detect detachment (20) of the stylus pen 500 in the stand-by state (10). The electronic device 600 may detect a separation operation of the stylus pen 500 through the first wireless charging coil 605 (referring to FIG. 6). When the separation operation of the stylus pen 500 is detected, the electronic device 600 may perform a BLE scanning operation through the antenna 665 (referring to FIG. 6) and the wireless communication circuit 660 (referring to FIG. 6).

In operation 30, the stylus pen 500 may transmit an ADV_IND message (e.g., an active subscribe message) to the electronic device 600, and initiate a communication connection between the electronic device 600 and the stylus pen 500.

In operation 40, in response to the received ADV_IND message, the electronic device 600 may transmit a connection request (CONNECT_REQ) message to the stylus pen 500, and request a connection between the electronic device 600 and the stylus pen 500.

In operation 50, in response to the received CONNECT_REQ message, the stylus pen 500 may transmit a BLE connection complete message to the electronic device 600.

In operation 60, the stylus pen 500 may transmit a data channel PDU #1 to the electronic device 600.

In operation 70, the electronic device 600 may transmit a data channel PDU #2 to the stylus 500. Through this, a communication connection may be established between the electronic autonomous unit 600 and the stylus pen 500.

In operation 80, the electronic device 600 may activate second communication (e.g., BLE communication), that is, a second communication connection state from the stand-by state to the connected state.

In operation 90, the stylus pen 500 may perform an interaction.

In an embodiment, the electronic device 600 may receive a BLE advertising signal from the stylus pen 500. As shown in FIG. 9A, the BLE advertising signal may include a header 810 and an advertising PDU payload 820.

As shown in FIG. 9B, the advertising PDU payload 820 may include an advertising address (AdvA) 821 and advertising data (AdvData) 822.

As shown in FIG. 9C, the AdvData 822 may be configured in the form of an advertising packet 830. Looking at the advertising packet 830, the advertising packet 830 may include flag data of an advertising device and manufacturer data information. Also, manufacturer data may include a company ID, a version, a service ID, and service specific data information. Also, a service ID (e.g., a remote input device, a wrist watch-type wearable device, a wireless earphone device, etc.) of a remote input device may be defined through the service ID. Also, service requirement information of the remote input device may be added through the service specific data information (e.g., motion sensor information of the remote input device and heart rate sensor information and wearing detection sensor information of the wearable device).

As an embodiment, when the stylus pen 500 is detached (separated) from the electronic device 600, the electronic device 600 may receive a BLE advertising signal from the stylus pen 500. The electronic device 600 may communicatively connect with the stylus pen 500, based on the received BLE advertising signal. Here, the electronic device 600 may identify the stylus pen 500, based on a service ID of the received BLE advertising signal. The electronic device 600 may extract motion sensor information of the stylus pen 500 through service specific data information of the BLE advertising signal. The electronic device 600 may receive a data PDU including motion sensor data in response to an input event of the stylus pen 500 in a communication connection state with the stylus pen 500. In this case, it may be possible to receive an advertising PDU only before the communication connection.

Figure 10:
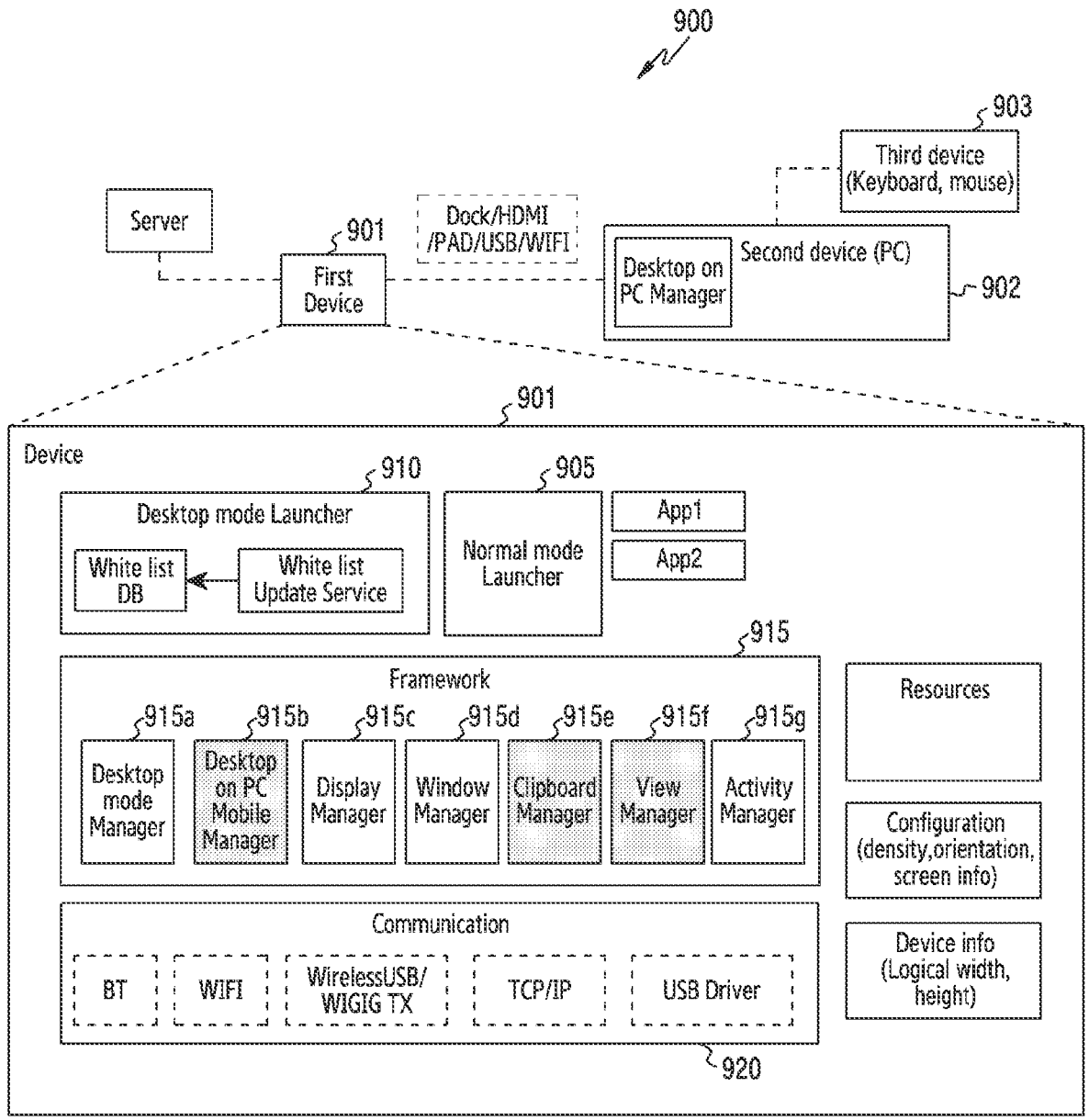
FIG. 10 is a diagram illustrating an operation structure of a DEX system according to various example embodiments.

FIG. 10 is a diagram illustrating an operation structure of a DEX system 900 according to various embodiments.

Referring to FIG. 10, the DEX system 900 may include a normal mode launcher 905, a desktop mode launcher 910, an application (Activity), a window, a framework 915, a communication module 920, resources, configuration (density, orientation, and screen information), and device info (logical width and height).

The normal mode launcher 905 is a home launcher displayed on a display of the electronic device 600, when the electronic device 600 is not connected to an external device (e.g., the display device 700).

The desktop mode launcher 910 is a launcher executed to present a desktop usability by connecting the electronic device 600 with the external display device 700 (e.g., a monitor and a PC). The desktop mode launcher 910 may be displayed on a screen of the connected display device 700. In the case of a dual mode, the normal mode launcher 905 may be displayed on a screen of the electronic device 600, and the desktop mode launcher 910 may be displayed on the screen of the display device 700 connected to the electronic device 600.

An application may be composed of a plurality of activities. Each activity may present a screen in a landscape mode only, a portrait mode only, and a landscape and portrait mode, according to a screen construction. In the case of a desktop mode, a screen suitable for a resolution of the display device 700 connected to the electronic device 600 may be constructed and displayed.

When an application is executed in the desktop mode, application information may be displayed on the window. When the window is provided in a dual mode, as a user executes the application (App) on any display (e.g., the electronic device 600 or the display device 700), the window may be provided and the executed Application may be displayed on the executed display.

The window may present Back/Minimize/Maximize/Close functions through a top header. Some landscape-view non-support apps may not be displayed on the screen, because rotation and maximize functions are not presented. There is no limitation on the number of windows, and it is possible to present a multi-instance function capable of executing several identical applications. As an embodiment, up to maximum five applications may be driven.

A portrait-only application may non-present a maximization button and limit a maximization size. Minimize may designate a size that guarantees the most basic usability of the app, as a minimum size. Maximize may be a size that uses the entire screen, and when the window is closed, the corresponding application may be completely terminated (Process killed) on a memory, rather than being executed in the background. A scroll bar in the window is not always presented, but may be presented when a window region becomes smaller than a content region due to a change of a window size. When an available memory according to a multi-window operation is 400 MB or less, a warning screen may be displayed to a user.

The framework 915 may include a desktop mode manager (service) 915a, a desktop on PC mobile manager 915b, a display manager 915c, a window manager 915d, a clipboard manager 915e, a view manager 915f, and an activity manager 915g.

When an application is executed, the desktop mode manager (service) 915a may load an exception for each application. Determining and returning for each activity may be performed, and when there is no activity, the application may be checked. The exception may be information on whether the app is executed in a compatibility mode (static window) when the app is executed or whether the app is executed in a freeform window, and/or information related to whether orientation is supported, whether resize is supported, etc. The exception may be information related to whether the app is executed in the compatibility mode (static window) when the app is executed, or whether the app is executed in the freeform window, and/or information related to whether orientation is supported, whether resize is supported, etc.

When the configuration & display info is not separately adjusted, the corresponding values may be delivered based on a screen size, and accordingly, layout and touch errors, etc. may occur. Accordingly, the application operating in the compatibility mode may adjust the configuration & display info.

The configuration may include information such as density, orientation, and screen size info (width, height), etc. The display info may be applied with a logical width and a logical height.

The clipboard manager 915e may manage a service supporting Copy & Paste. It is possible to store contents copied by a user in the form of clip data, and return the most recently stored clip data when pasting. Or, a clipboard user interface (UI) may be presented wherein the user may select desired clip data from among the stored clip data.

The view manager 915f may deliver a file description, URI information, and the like, when a file is moved through drag and drop.

The desktop on PC mobile manager 915b is executed on a mobile phone (or a smart phone), and a user may pass coordinate information such as a moving mouse pointer position, a touch pad position, and the like by using an input (device). A PC Manager is executed individually on a PC, and the user may pass the coordinate information such as the moving mouse pointer position, the touch pad position, and the like, by using the input (device). As an embodiment, the PC manager may allow the user to freely move, by using a mouse, to a DEX screen which is seen on a PC screen and/or a window screen where a program installed in the PC in the window is displayed. The PC manager may deliver coordinate information of the PC or event information occurring in the PC, to the desktop PC mobile Manager. The PC manager, the desktop PC mobile manager, may deliver a corresponding event to each application that is running on a phone.

A DeX Live Manager on mobile may present a guide wherein, when a user first connects a terminal and an external device (PC) with an HDMI/USB, the external device (PC) may, after installing a driver, install a desktop on PC program for the sake of introduction of a desktop mode and execution of the desktop mode. Functions such as event injection such as mouse wheel, etc. among events occurring in a DeX Live window, a file movement in association with the DeX live manager on PC, etc. may be performed. The DeX live manager on PC may perform functions such as terminal and PC connection, DeX Live window frame, file movement, mouse control, and mouse sync, etc. at DeX Live execution.

Figure 11:
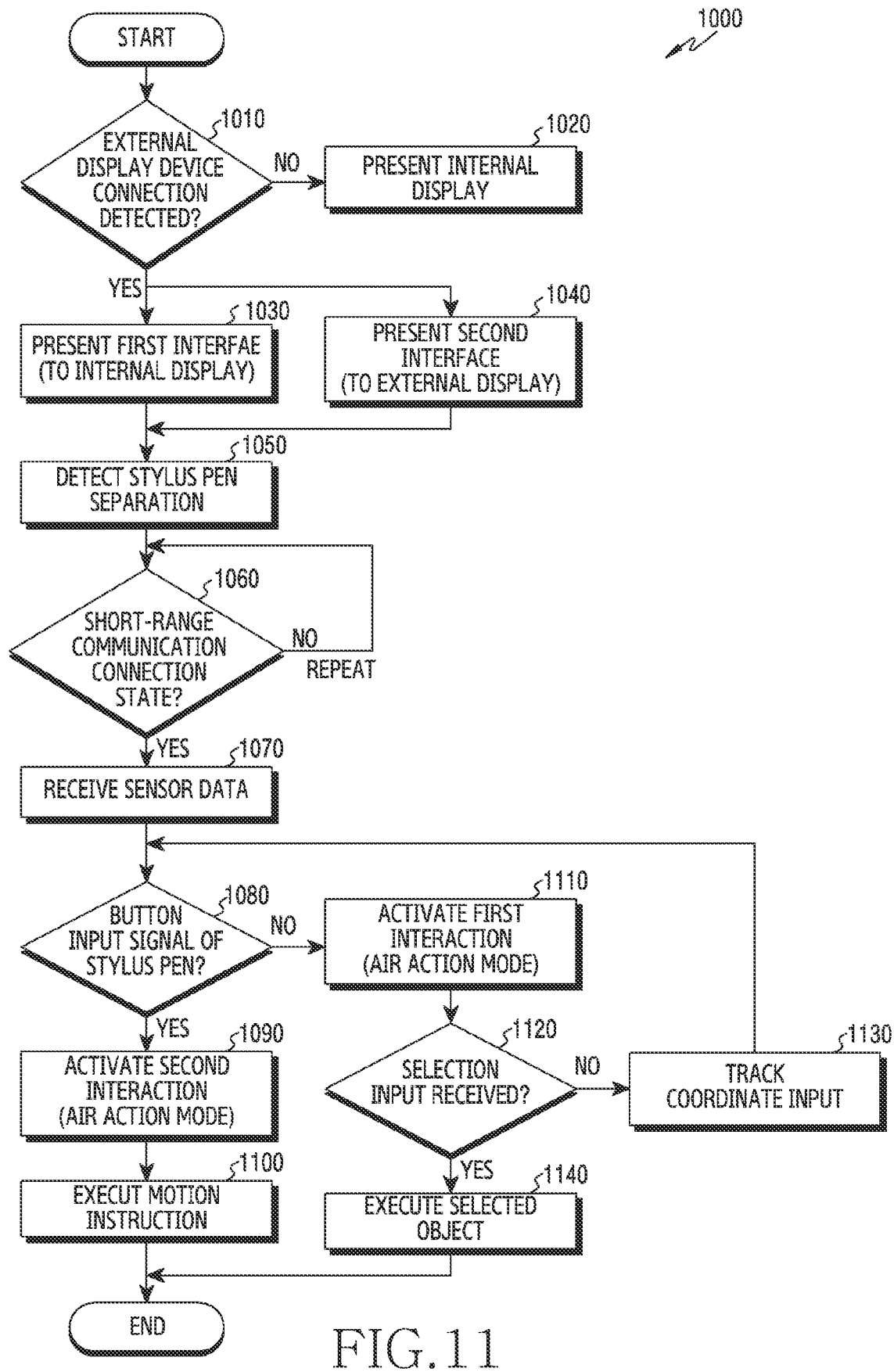
FIG. 11 is a flowchart illustrating a method for controlling a remote interaction of a remote input device (e.g., a stylus pen) while an electronic device and an external display device are connected in a DEX mode according to various example embodiments.
Figure 12:
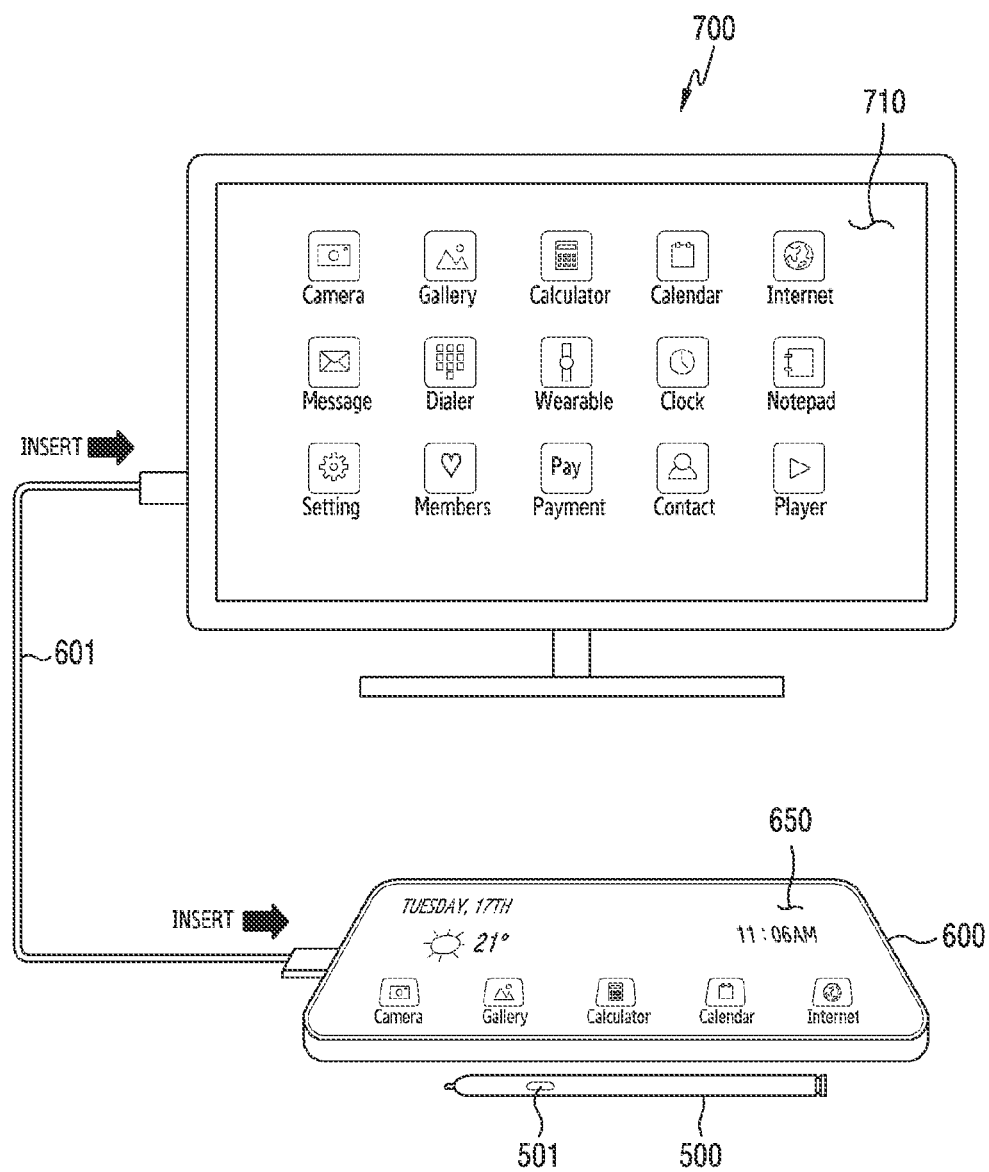
FIG. 12 is a diagram illustrating a method for DEX mode activation (USB-HDMI cable connection) according to various example embodiments.

FIG. 11 is a flowchart (1000) illustrating a method for controlling a remote interaction of a remote input device (e.g., the stylus pen 500) in a state in which the electronic device 600 and the external display device 700 are connected in a DEX mode according to various embodiments. FIG. 12 is a diagram illustrating a method for DEX mode activation (USB-HDMI cable connection) according to various embodiments.

Referring to FIG. 11 and FIG. 12, the electronic device 600 may electrically connect with the external display device 700 by using the cable 601 (e.g., USB type-C, HDMI, or USB-HDMI cable). For example, a first terminal of the USB-HDMI cable may be constructed as a USB type-C connector (to the electronic device), and a second terminal may be constructed as an HDMI connector (to the external display device).

In operation 1010, the electronic device 600 may determine a communication connection (e.g., the HDMI, the USB type-C) to the external display device 700. That is, the electronic device 600 may detect DEX activation. As an embodiment, the electronic device 600 may detect an electrical connection of the external display device 700 through the cable 601 (e.g., the USB-HDMI cable), and perform a communication connection process (e.g., HDMI communication), thereby receiving information of the external display device 700. The electronic device 600 may activate a DEX mode (e.g., a desktop/notebook mode), based on the received information of the external display device 700.

When the electronic device 600 and the external display device 700 are not connected as the determination result of 1010, a user interface may be presented on the internal display 650 of the electronic device 600 (1020).

When the electronic device 600 and the external display device 700 are connected as the determination result of 1010, a first interface may be presented to the internal display 650 of the electronic device 600 (1030). Also, a second interface may be presented to the display 710 of the external display device 700 (1040).

As an embodiment, the electronic device 600 may construct the second interface different from the first interface displayed on the internal display 650, based on the information of the external display device in the DEX mode activated, and transmit data related to the second interface to the external display device 700.

In operation 1050, the electronic device 600 may detect a separation operation of the stylus pen 500.

In operation 1060, the electronic device 600 may determine whether it is in a short-range communication connection state with the stylus pen 500.

When the electronic device 600 and the stylus pen 500 are in the short-range communication state as the determination result of 1060, the electronic device 600 may receive sensor data from the stylus pen 500 (1070).

In operation 1080, the electronic device 600 determines whether a button 501 input signal and sensor data of the stylus pen 500 have been received. In this case, the electronic device 600 may determine the button 501 input signal and sensor data received from the wirelessly connected stylus pen 500. That is, the electronic device 600 may receive and determine a trigger input from the stylus pen 500. In response to the button 501 and sensor data of the stylus pen 500, the electronic device 600 may determine at least one interaction.

When the button 501 input signal and sensor data of the stylus pen 500 are not received as the determination result of 1080, the electronic device 600 may activate a first interaction (e.g., an air mouse mode) (1110).

When the button 501 input signal and sensor data of the stylus pen 500 are received as the determination result of 1080, the electronic device 600 may activate a second interaction (e.g., an air action mode) (1090).

In operation 1100, the electronic device 600 may operate in the second interaction (e.g., the air action mode) and execute a motion instruction that is based on a motion of the stylus pen 500.

In operation 1120, in response to the movement of the stylus pen 500, the mouse cursor 720 may be displayed on a screen of the display device 700. In response to an input of the button 501 of the stylus pen 500, an application displayed on the screen of the display device 700 may be selected and executed.

The electronic device 600 may determine whether the selection input using the mouse cursor 720 has been received from the stylus pen 500.

When the selection input is not received from the stylus pen 500 as the determination result of 1120, the electronic device 600 may perform a coordinate input track of the mouse cursor 720 according to the movement of the stylus pen 500 (1130).

When the selection input is received from the stylus pen 500 as the determination result of 1120, the electronic device 600 may execute an object selected through the stylus pen 500 (1140).

As illustrated in FIG. 12, the electronic device 600 may communicatively connect with the external display device 700 through wireless communication (e.g., Wi-Fi). And, the electronic device 600 may connect with the external display device 700 (e.g., a monitor, a TV, a notebook, and a tablet) through a DEX station, a DEX pad, or the like, as well as the cable 601. In some cases, the electronic device 600 may convert the first interface presented through the internal display 650 and present the same user interface (UI) through the external display device 700. That is, the electronic device 700 may present screen mirroring. And, the electronic device 600 may independently control the different first interface and second interface. For example, when the electronic device 600 executes a messenger app through the first interface, the second interface of the external display device 700 may independently control not to display the executed message app. In particular, the electronic device 600 may communicatively connect with a notebook device having a different operating system (OS) through the cable 601 (e.g., the USB-HDMI cable). In this case, the electronic device 600 may newly provide a window having a second interface on a screen of the operating system (OS) of the notebook device, thereby activating the DEX mode through the external electronic device.

Figure 13:
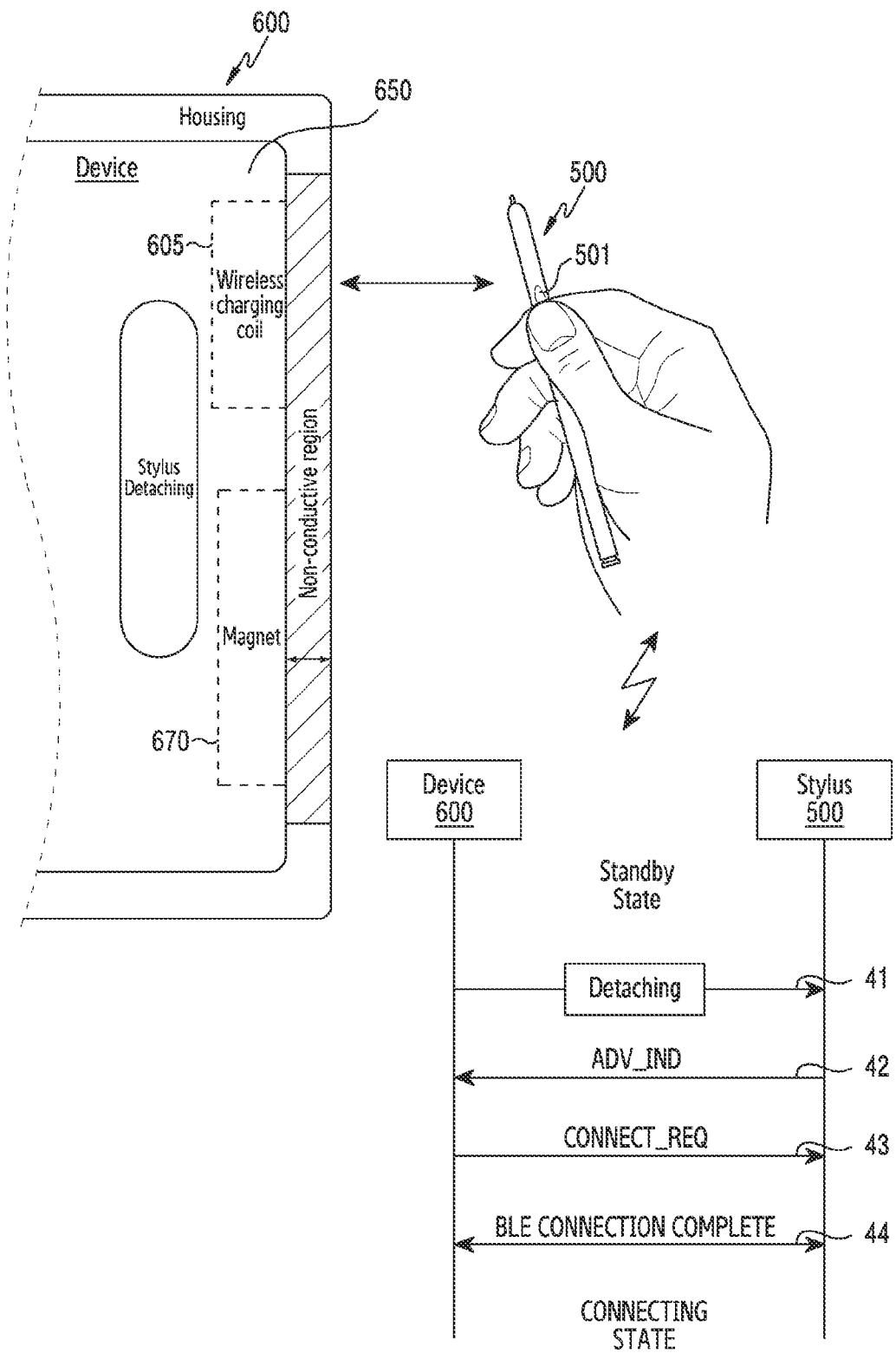
FIG. 13 is a diagram illustrating a detection of separation (or detachment) of a remote input device (e.g., a stylus pen) and a method for BLE connection between an electronic device and the remote input device (e.g., the stylus pen) according to various example embodiments.

FIG. 13 is a diagram illustrating a detection of separation (or detachment) of a remote input device (e.g., the stylus pen 500) and a method for BLE connection between the electronic device 600 and the remote input device (e.g., the stylus pen 500) according to various embodiments.

Referring to FIG. 13, in operation 41, the electronic device 600 may periodically detect a separated (or detached) state of the stylus pen 500. In this case, it may be assumed that the electronic device 600 and the stylus pen 500 have already completed a pairing process.

When the stylus pen 500 is separated from the first wireless charging coil 650 (referring to FIG. 6) of the electronic device 600, an electrical signal by an induced magnetic field is not received. In response to a separation operation of the stylus pen 500, the electronic device 600 may change from a stand-by state to an initiating state.

In operation 42, the electronic device 600 may receive an advertising signal (ADV_IND) from the stylus pen 500.

In operation 43, in response to the received advertising signal (ADV_IND), the electronic device 600 may transmit a communication connection request signal (Connection Request) to the stylus pen 500.

In operation 44, in response to the received advertising signal (ADV_IND), the electronic device 600 may convert into a connecting state.

Here, the electronic device 600 may display a separation process and a communication connection process of the stylus pen 500 on a screen through a notification message.

As discussed herein, each embodiment herein may be used in combination with any other embodiment described herein.

Figure 14:
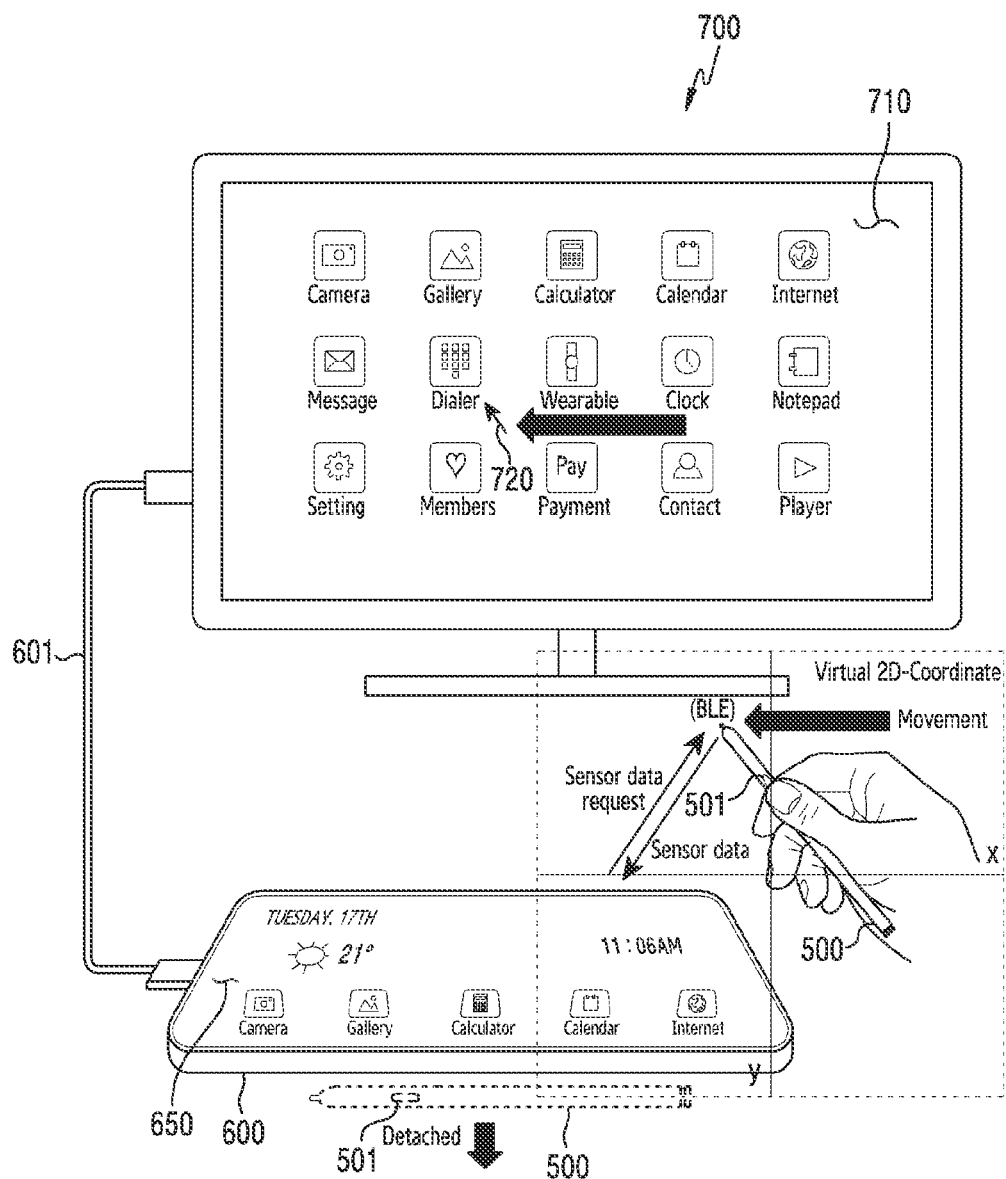
FIG. 14 is a diagram illustrating a separation operation of a remote input device (e.g., a stylus pen) and a method for first interaction activation of an electronic device according to various embodiments.

FIG. 14 is a diagram illustrating a separation operation of a remote input device (e.g., the stylus pen 500) and a method for activating a first interaction of the electronic device 600 according to various embodiments.

Referring to FIG. 14, in response to the separation operation of the stylus pen 500, the electronic device 600 may receive sensor data from the stylus pen 500.

When the sensor data received from the stylus pen 500 does not include a button 501 input signal (e.g., when there is no button 501 input event), the electronic device 600 may activate the first interaction (e.g., an air mouse mode), in response to the sensor data of the stylus pen 500.

When the first interaction (e.g., the air mouse mode) is activated, the electronic device 600 may provide a virtual coordinate space in response to the received sensor data of the stylus pen 500.

As an embodiment, when receiving sensor data from a plurality of sensors (e.g., an acceleration sensor and a gyro sensor), the electronic device 600 may provide a virtual 2-dimension (2D) coordinate space and coordinate information in response to the sensor data.

The electronic device 600 may display a graphic object (e.g., the mouse cursor 720) in the second interface in response to the movement of the stylus pen 500. That is, the electronic device 600 may display the mouse cursor 720 on the display 710 of the external display device 700 according to the movement of the stylus pen 500 in the virtual coordinate space.

When receiving sensor data from a plurality of sensors (e.g., acceleration/gyro/geomagnetic sensors), the electronic device 600 may provide a virtual 3-dimension (3D) coordinate space and coordinate information in response to the sensor data. The electronic device 600 may display a graphic object (e.g., an AR game tool) in the second interface in response to the movement of the stylus pen 500.

In response to motion sensor (e.g., acceleration/gyro/geomagnetic sensors) data of the stylus pen 500, the electronic device 600 may control a display position of at least one graphic object (e.g., the mouse cursor 720) for the first interface and the second interface. In this case, the electronic device 600 may determine a time point for determining a coordinate of the graphic object from the received sensor data analysis result.

As an embodiment, when the electronic device 600 recognizes a specific mounted state (e.g., a horizontal/vertical state) of the stylus pen 500 during a predetermined time or more from the sensor data analysis result, the electronic device 600 may display at least one graphic object (e.g., the mouse cursor 720) for the first interface and the second interface. That is, when the stylus pen 500 does not change in a horizontal/vertical state during a predetermined time or more (a state of not using the stylus pen 500), the electronic device 600 may maintain an air mouse mode. In this case, the electronic device 600 may display wherein the mouse cursor 720 returns to its original position (default position).

Figure 15:
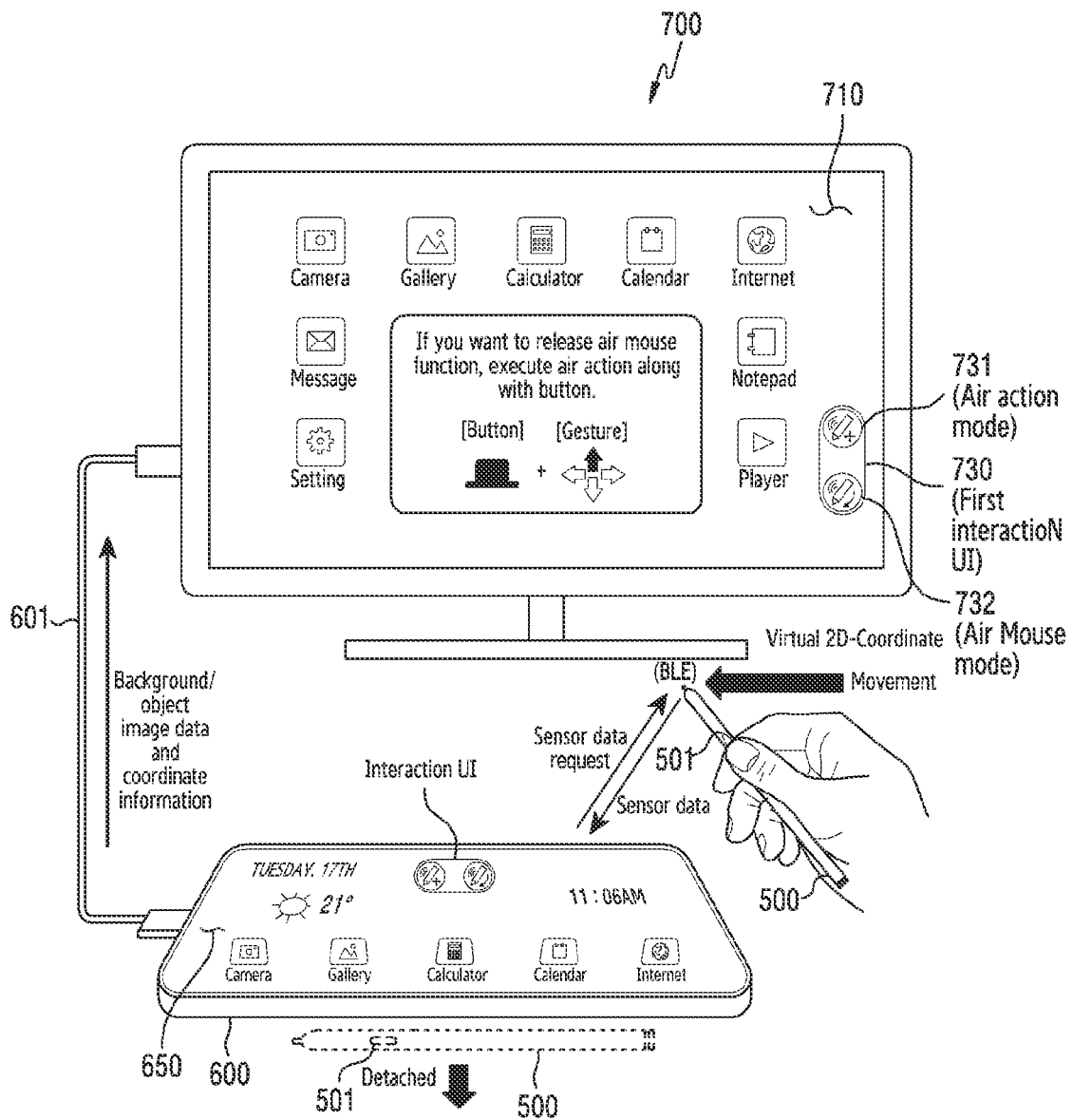
FIG. 15 is a diagram illustrating a separation operation of a remote input device (e.g., a stylus pen) and a method for presenting a user interface of a first interaction according to various example embodiments.

FIG. 15 is a diagram illustrating a separation operation of a remote input device (e.g., the stylus pen 500) and a method for presenting a user interface of a first interaction of the electronic device 600 according to various embodiments.

Referring to FIG. 15, in response to a communication connection state (or a DEX mode activation state) of the external display device 700 and the separation operation of the stylus pen 500, the electronic device 600 may transmit a sensor data request message to the stylus pen 500 through second communication (e.g., BLE communication).

In response to the sensor data request message, the electronic device 600 may receive sensor data (e.g., motion sensor data and/or a button 501 input event) from the communication connected stylus pen 500. In response to the separation operation of the stylus pen 500, the electronic device 600 may present, through a first interface, an activation user interface (UI) 730 for determining an activation display of a first interaction and an activation of a plurality of interactions. In addition, in response to the separation operation of the stylus pen 500, the electronic device 600 may present, through a second interface, the first interaction user interface (UI) 730 for determining the activation display of the first interaction and the activation of the plurality of interactions.

Even if the first interaction is not displayed after a predetermined time, the electronic device 600 may determine at least one interaction (e.g., air mouse/air action) for the stylus pen 500, in response to the sensor data and the button 501 input event included in the sensor data. As an embodiment, when receiving sensor data not including the button 501 input event, the electronic device 600 may activate the first interaction (e.g., the air mouse mode), in response to the sensor data received from the stylus pen 500.

While the electronic device 600 presents a temporary interaction user interface (UI) in response to the separation operation of the stylus pen 500, the electronic device 600 may receive a second interaction (e.g., a button 501 and gesture input) for forcibly releasing the activation of the first interaction from the stylus pen 500. In this case, the electronic device 600 may present a guide screen through the second interface so as to guide a method for forcibly releasing the activation of the first interaction, together with the first interaction user interface (UI) 730.

As an embodiment, while the interaction UI is displayed on the display 710 of the display device 700, the electronic device 600 may receive motion sensor data corresponding to an "UP" direction, together with the button 501 input event of the stylus pen 500. The scope is not limited thereto, and the motion sensor data may be applied not only to the "UP" direction, but also to a "DOWN", "LEFT", or "RIGHT" direction.

The electronic device 600 may forcibly release the first interaction (e.g., the air mouse mode), based on the button 501 input event of the stylus pen 500 and the motion sensor data corresponding to the "UP" direction, and activate the second interaction (e.g., an air action mode).

Figure 16:
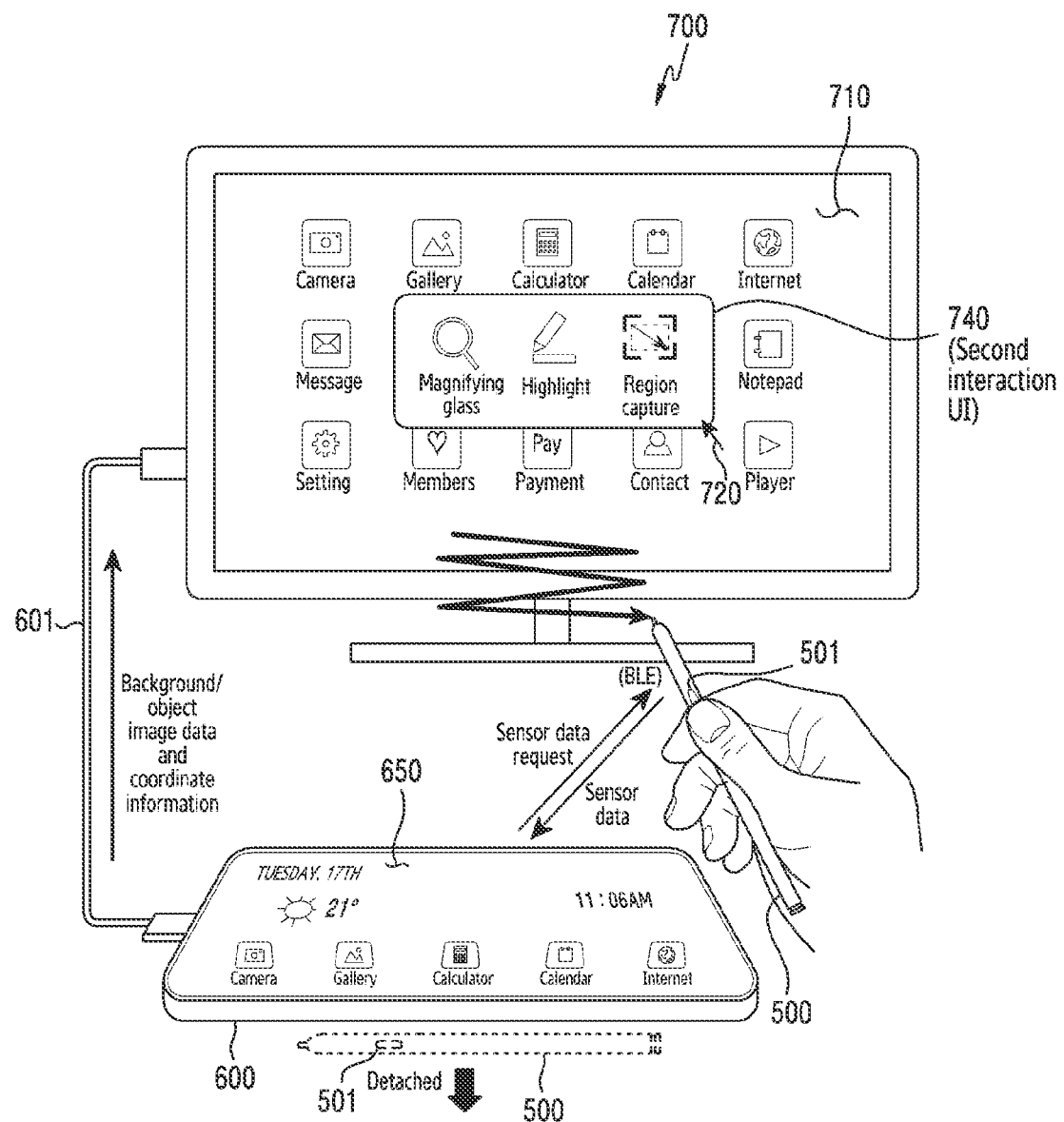
FIG. 16 is a diagram illustrating a separation operation of a remote input device (e.g., a stylus pen) and a method for presenting a user interface (UI) of a second interaction dependent on a global action according to various example embodiments.

FIG. 16 is a diagram illustrating a separation operation of a remote input device (e.g., the stylus pen 500) and a method for presenting a user interface (UI) of a second interaction dependent on a global action according to various embodiments.

Referring to FIG. 16, the electronic device 600 may present a second interaction user interface (UI) 740, in response to a global action (e.g., shaking left/right, shaking up/down, or shaking in a diagonal direction) of the stylus pen 500. In this case, the electronic device 600 may present the second interaction user interface (UI) 740 for selecting at least one execution mode from among a plurality of execution modes related to the stylus pen 500 through a second interface.

In response to the separation operation of the stylus pen 500, the electronic device 600 may present the second interaction user interface (UI) 740. In this case, the second interaction user interface (UI) 740 may present an independent interaction for the second interface, unlike a running application user interface (UI).

As an embodiment, the electronic device 600 may present a plurality of different execution modes such as a magnifying glass mode, a highlight mode, and a capture mode, etc., through the second interaction user interface (UI) 740.

The electronic device 600 may select or convert another execution mode in the second interaction user interface (UI) 740 through a first interaction and a second interaction while the second interaction user interface (UI) 740 is temporarily displayed.

The magnifying glass mode indicates presenting an enlarged window corresponding to the first interaction (air mouse mode). The highlight mode indicates presenting a handwriting input corresponding to the second interaction (air action mode). The region capture mode indicates presenting capture region setting and image capturing that use the second interaction.

In the highlight mode, the electronic device 600 may determine coordinate information, based on the second interaction (e.g., the air action mode) received from the stylus pen 500, and may present a handwriting input of a highlight color for some content of the second interface.

In the magnifying glass mode, the electronic device 600 may determine coordinate information, based on the first interaction (e.g., the air mouse mode) received from the stylus pen 500. The electronic device 600 may present a window having a predetermined region for magnifying some content of the second interface in response to the coordinate information. In this case, the plurality of execution modes displayed on the second interaction user interface (UI) 740 may be displayed in different combinations according to application information (e.g., gallery or browser) executed on the second interface. As an embodiment, when executing a browser, the electronic device 600 may additionally display a scroll capture mode together with the region capture mode.

Figure 17:
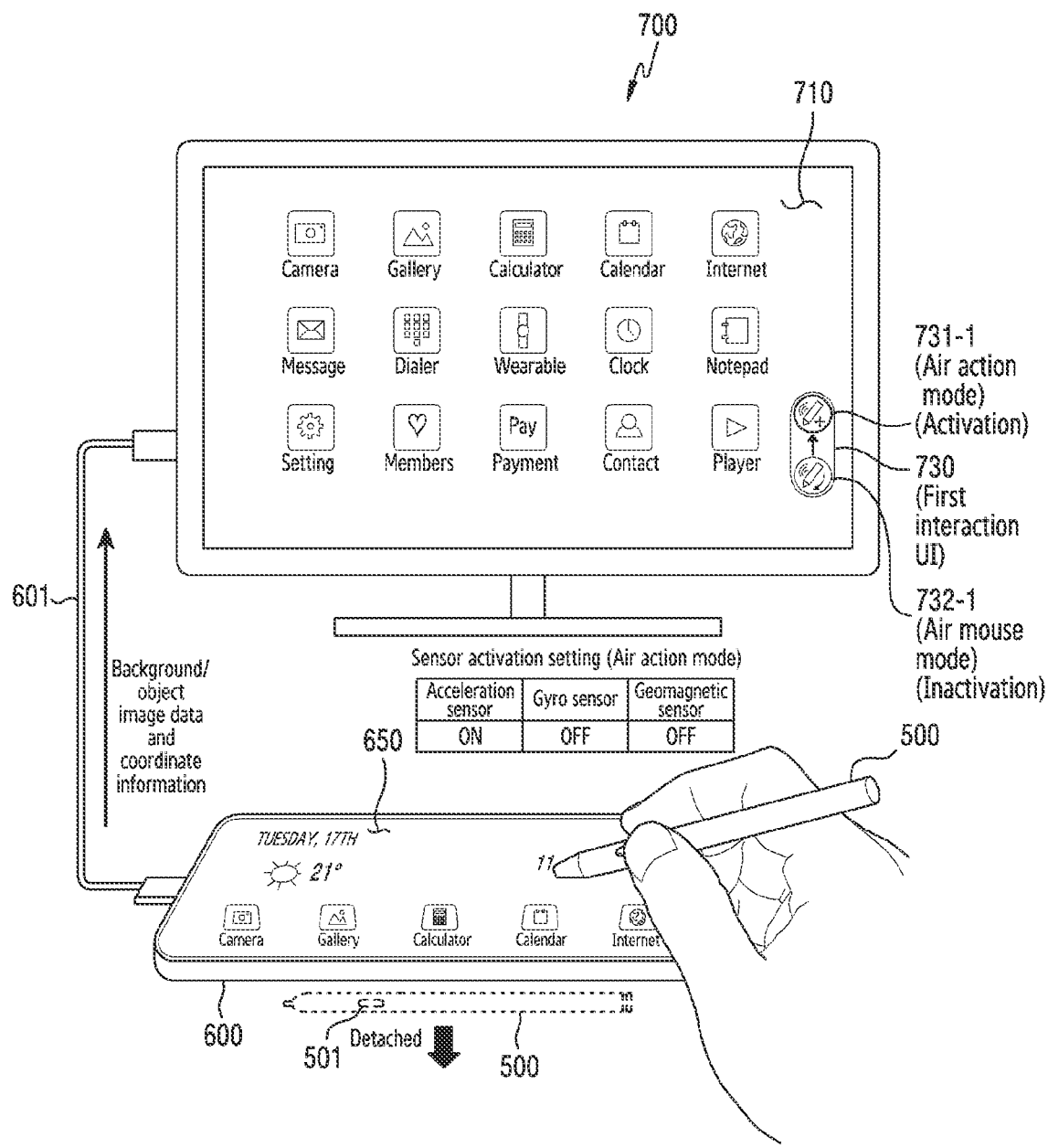
FIG. 17 is a diagram illustrating an operation of interaction conversion when a remote input device (e.g., a stylus pen) approaches an electronic device according to various example embodiments.

FIG. 17 is a diagram illustrating an interaction conversion operation when a remote input device (e.g., the stylus pen 500) approaches an electronic device according to various embodiments.

Referring to FIG. 17, when the stylus pen 500 approaches the internal display 650, the electronic device 600 may release (732-1) an air mouse mode, based on the proximity of the stylus pen 500, and execute a power saving mode.

The electronic device 600 may detect the proximity of the stylus 500 (e.g., a pen tip) through the internal display 650. When detecting the proximity (e.g., proximity of 5 to 10 centimeters) of the stylus pen 500, the electronic device 600 may execute the interaction conversion operation for the set first interaction and second interaction. The power saving mode execution and the quick interaction conversion operation for the stylus pen 500 may be performed.

As an embodiment, when detecting the proximity of the stylus pen 500 through the internal display 650, the electronic device 600 may forcibly release (732-1) the currently activated first interaction (e.g., the air mouse mode), and activate (731-1) the second interaction (e.g., the air action mode). In addition, in response to the proximity operation of the stylus pen 500, the electronic device 600 may transmit an execution instruction through second communication so as to change a motion sensor activation state of the stylus pen 500.

When the stylus pen 500 receives the execution instruction of the electronic device 600 according to the activation of the second interaction, the stylus pen 500 may deactivate some motion sensors of the stylus pen 500 in accordance with the execution instruction for the sake of executing the power saving mode.

As an embodiment, when the stylus pen 500 receives the execution instruction for activating the first interaction, the stylus pen 500 may activate all of an acceleration sensor, a gyro sensor and a geomagnetic sensor.

As an embodiment, when receiving the execution instruction for activating the second interaction, the stylus pen 500 may activate only the acceleration sensor. That is, the electronic device 600 may execute a quick power saving mode by converting the remote input device from a first interaction state to a second interaction state, in response to the proximity operation of the stylus.

The internal display 650 of the electronic device 600 may include a sensing panel (e.g., a touch screen or an EMR panel) for detecting a pen tip sensor signal of the stylus pen 500. A pen tip sensor of the stylus pen 500 may present a capacitive signal or a resonance frequency signal.

The electronic device 600 of various example embodiments may present a plurality of remote interactions in a DEX mode. In the DEX mode, the electronic device 600 may increase DEX usability according to the activation of a basic air mouse mode. The electronic device 600 may present an intuitive interaction conversion operation by bringing the pen tip of the stylus pen 500 close to the display 650.

According to various example embodiments, the electronic device 600 may determine at least one compatible wireless communication standard in response to an attachment/detachment state of the stylus pen 500. The electronic device 600 may convert to a wireless connection state with the stylus pen 500. The electronic device 600 may present a first interface (e.g., a first user interface screen) for the wirelessly connected stylus pen 500 through the built-in display 650.

The electronic device 650 may output a signal (e.g., a graphic buffer signal) for presenting a user interface through the peripheral external display device 700 and a wired/wireless communication standard (e.g., a high-definition multimedia interface (HDMI), wireless fidelity (WiFi), etc.). The electronic device 600 may present a second interface (e.g., a second user interface screen) through the external display device 700 connected through wired/wireless communication. It may control at least one graphic object (e.g., an app icon) from the second interface in response to a touch control input of the electronic device 600. In this case, the electronic device 600 may optimize to information of the wired/wireless connected external display device 700 and present the second interface (e.g., a DEX screen) different from the first interface.

An electronic device 600 of various example embodiments may include a first communication circuit 660, a second communication circuit 675, a wireless charging coil 605, a sensor circuit 176, a first interface display unit, a second interface display unit, and a processor 640. The first communication circuit 660 may connect, directly or indirectly, first communication with a remote input device positioned in the electronic device 600. The second communication circuit 675 may connect, directly or indirectly, second communication with an external display device 700. The wireless charging coil 605 may sense a change of a magnetic field signal of the remote input device 500, and output an electrical signal dependent on the change of the magnetic field signal. The sensor circuit 176 may sense the movement of the remote input device 500. The first interface display unit may display a first user interface 690 on an internal display 650 of the electronic device 600. The second interface display unit may display a second user interface 790 on the external display device 700. The processor 640 may determine the attachment and detachment of the remote input device 500, and recognize a button input signal of the remote input device 500 and sensor data of the remote input device 500, through wireless communication. The processor 640 may activate one of a plurality of interactions, based on the button input signal or the sensor data. Each "processor" herein comprises processing circuitry.

According to an embodiment, the processor may display a first user interface through the internal display of the electronic device, and display a second user interface on the external display device, in response to the activation of one of the plurality of interactions.

According to an embodiment, the plurality of interactions may include a first interaction for displaying a coordinate input track of the remote input device in a first mode, and a second interaction for displaying the execution of a motion instruction of the remote input device in a second mode.

According to an embodiment, the processor may activate the first interaction when the button input signal of the remote input device is not received, and display a screen of the first interaction on the external display device.

According to an embodiment, the processor may receive sensor data of an acceleration sensor and a gyro sensor of the remote input device, provide a virtual coordinate space and coordinate information, based on the sensor data, and display a graphic object corresponding to the movement of the remote input device on the external display device, by using the virtual coordinate space and coordinate information.

According to an embodiment, the processor may activate the second interaction when the button input signal of the remote input device is received, and display a screen of the second interaction on the external display device.

According to an embodiment, the processor may release the first interaction and activate the second interaction, when the button input signal and a gesture input are received in a state in which the first interaction is activated.

According to an embodiment, the processor may display, on the external display device, a third user interface for selecting one of the first interaction and the second interaction through a global action of the remote input device in the first mode.

According to an embodiment, the processor may convert a currently activated interaction into another interaction, when receiving a pen tip magnetic field signal of the remote input device through the internal display.

A remote interaction control method of an electronic device 600 of various example embodiments may include connecting first communication with a remote input device positioned in the electronic device, connecting second communication with an external display device, outputting an electrical signal dependent on the attachment and detachment of the remote input device, determining the detachment of the remote input device with respect to the electronic device, receiving, through wireless communication, a button input signal of the remote input device and sensor data of the remote input device, and activating one of a plurality of interactions, based on at least one of the button input signal and the sensor data of the remote input device.

According to an embodiment, the remote interaction control method may further include displaying a first user interface through an internal display of the electronic device, and displaying a second user interface on the external display device, in response to the activation of one of the plurality of interactions.

According to an embodiment, the plurality of interactions may include a first interaction for displaying a coordinate input track of the remote input device in a first mode, and a second interaction for displaying the execution of a motion instruction of the remote input device in a second mode.

According to an embodiment, activating one of the plurality of interactions may include activating the first interaction when the button input signal of the remote input device is not received, and displaying a screen of the first interaction on the external display device.

According to an embodiment, activating the first interaction may include receiving sensor data of an acceleration sensor and a gyro sensor of the remote input device, and providing a virtual coordinate space and coordinate information, based on the sensor data, and displaying the screen of the first interaction may include displaying a graphic object corresponding to the movement of the remote input device on the external display device, by using the virtual coordinate space and coordinate information.

According to an embodiment, activating one of the plurality of interactions may include activating the second interaction when the button input signal of the remote input device is received; and displaying a screen of the second interaction on the external display device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a first communication circuit configured to connect a first communication with a remote input device for the electronic device;
a second communication circuit configured to connect a second communication with an external display device comprising a display;
a wireless charging coil configured to sense a change of a magnetic field signal of the remote input device, and output an electrical signal based on the change of the magnetic field signal; and
a processor electrically connected to the first communication circuit, the second communication circuit, and the wireless charging coil,
wherein the processor is configured to:
detect that the remote input device is detached from the electronic device using the wireless charging coil, in a connection state in which the electronic device and the external display device are connected;
determine whether a button input signal of the remote input device and sensor data of the remote input device, is received in the connection state;

based on the button input signal and the sensor data not having been received in the connection state, activate a first interaction; and based on the button input signal and the sensor data having been received in the connection state, activate a second interaction.

2. The electronic device of claim 1, wherein the processor is further configured to:

control to display a first user interface on an internal display of the electronic device, and control to display a second user interface on the display of the external display device, in response to the activation of one of the first interaction and the second interaction.

3. The electronic device of claim 1, wherein the first interaction is for displaying a coordinate input track of the remote input device in a first mode; and wherein the second interaction is for displaying the execution of a motion instruction of the remote input device in a second mode.

4. The electronic device of claim 3, wherein the processor is further configured to:

control to display a screen of the first interaction on the display of the external display device based on the first interaction being activated, and control to display a screen of the second interaction on the display of the external display device based on the second interaction being activated.

5. The electronic device of claim 1, wherein, in a state in which the first interaction is activated, the processor is further configured to:

receive sensor data of an acceleration sensor and a gyro sensor of the remote input device, provide a virtual coordinate space and coordinate information, based on the sensor data, and control to display a graphic object corresponding to the movement of the remote input device on the external display device, based on the virtual coordinate space and coordinate information.

6. The electronic device of claim 5, wherein the processor is further configured to:

control to display, on the display of the external display device, a third user interface for selecting one of the first interaction and the second interaction through a global action of the remote input device in the first mode.

7. The electronic device of claim 5, wherein the processor is further configured to:

convert a currently activated interaction into another interaction, based on receipt of a pen tip magnetic field signal of the remote input device through an internal display of the electronic device.

8. The electronic device of claim 1, wherein the processor is further configured to:

release the first interaction and activate the second interaction, based on receipt of the button input signal and a gesture input in a state in which the first interaction is activated.

9. The electronic device of claim 1, wherein the processor is further configured to:

detect a proximity of the remote input device to an internal display of the electronic device in a state in which the first interaction is activated; and based on the proximity of the remote input device being within a predetermine distance, release the first interaction.

10. A remote interaction control method of an electronic device, the method comprising:

connecting a first communication between the electronic device and a remote input device positioned in the electronic device;

connecting a second communication between the electronic device and an external display device comprising a display;

detecting that the remote input device is detached from the electronic device, in a connection state in which the electronic device and the external display device are connected;

determining whether a button input signal of the remote input device and sensor data of the remote input device in the connection state;

when the button input signal and the sensor data is not received in the connection state, activating a first interaction, when the button input signal and the sensor data is received in the connection state, activating a second interaction.

11. The remote interaction control method of claim 10, further comprising displaying a first user interface on an internal display of the electronic device and displaying a second user interface on the external display device, in response to the activation of one of the first interaction and the second interaction.

12. The remote interaction control method of claim 10, wherein the first interaction is for displaying a coordinate input track of the remote input device in a first mode; and wherein the second interaction is for displaying the execution of a motion instruction of the remote input device in a second mode.

13. The remote interaction control method of claim 12, further comprising:

displaying a screen of the first interaction on the external display device based on the first interaction being activated, and displaying a screen of the second interaction on the external display device based on the second interaction being activated.

14. The remote interaction control method of claim 10, wherein activating the first interaction comprises:

receiving sensor data of an acceleration sensor and a gyro sensor of the remote input device; and providing a virtual coordinate space and coordinate information, based on the sensor data, and wherein displaying the screen of the first interaction comprises:

displaying a graphic object corresponding to the movement of the remote input device on the external display device, by using the virtual coordinate space and coordinate information.

15. The remote interaction control method of claim 10, further comprising:

detecting a proximity of the remote input device to an internal display of the electronic device in a state in which the first interaction is activated; and based on the proximity of the remote input device being within a predetermine distance, releasing the first interaction.

\* \* \* \* \*